US009580329B2

(12) United States Patent
Li et al.

(10) Patent No.: US 9,580,329 B2
(45) Date of Patent: Feb. 28, 2017

(54) INTRODUCTION OF MESOPOROSITY INTO LOW SILICA ZEOLITES

(71) Applicant: Rive Technology, Inc., Boston, MA (US)

(72) Inventors: Kunhao Li, Princeton, NJ (US); Javier Garcia-Martinez, Alicante (ES); Michael G. Beaver, Princeton, NJ (US)

(73) Assignee: Rive Technology, Inc., Monmouth Junction, NJ (US)

( * ) Notice: Subject to any disclaimer, the term of this patent is extended or adjusted under 35 U.S.C. 154(b) by 836 days.

(21) Appl. No.: 13/740,839

(22) Filed: Jan. 14, 2013

(65) Prior Publication Data

US 2013/0183230 A1 Jul. 18, 2013

Related U.S. Application Data

(60) Provisional application No. 61/586,493, filed on Jan. 13, 2012.

(51) Int. Cl.
| | |
|---|---|
| *B01J 29/06* | (2006.01) |
| *C01B 39/02* | (2006.01) |
| *C01B 39/22* | (2006.01) |
| *C01B 39/14* | (2006.01) |
| *C01B 39/04* | (2006.01) |
| *B01J 29/04* | (2006.01) |
| *B01J 29/70* | (2006.01) |
| *B01J 29/08* | (2006.01) |
| *B01J 37/00* | (2006.01) |
| *B01J 35/10* | (2006.01) |

(52) U.S. Cl.
CPC .......... *C01B 39/026* (2013.01); *B01J 29/041* (2013.01); *B01J 29/082* (2013.01); *B01J 29/7003* (2013.01); *C01B 39/04* (2013.01); *C01B 39/14* (2013.01); *C01B 39/22* (2013.01); *B01J 35/109* (2013.01); *B01J 35/1033* (2013.01); *B01J 35/1038* (2013.01); *B01J 35/1061* (2013.01); *B01J 37/0018* (2013.01)

(58) Field of Classification Search
USPC .................. 502/60, 79, 85; 423/700, 716
See application file for complete search history.

(56) References Cited

U.S. PATENT DOCUMENTS

| | | | |
|---|---|---|---|
| 3,709,853 A | 1/1973 | Karapinka | |
| 3,864,280 A | 2/1975 | Schneider | |
| 4,016,218 A | 4/1977 | Haag et al. | |
| 4,088,671 A | 5/1978 | Kobylinski | |
| 4,196,182 A | 4/1980 | Willermet et al. | |
| 4,205,055 A | 5/1980 | Maire et al. | |
| 4,263,268 A | 4/1981 | Knox et al. | |
| 4,318,824 A | 3/1982 | Turner | |
| 4,439,349 A | 3/1984 | Everett et al. | |
| 4,564,207 A | 1/1986 | Russ et al. | |
| 4,609,972 A | 9/1986 | Edeling et al. | |
| 4,637,623 A | 1/1987 | Bubik | |
| 4,689,314 A | 8/1987 | Martinez et al. | |
| 4,704,375 A | 11/1987 | Martinez et al. | |
| 4,761,272 A | 8/1988 | Hucke | |
| 4,775,655 A | 10/1988 | Edwards et al. | |
| 4,806,689 A | 2/1989 | Gier et al. | |
| 4,816,135 A | 3/1989 | Martinez et al. | |
| 4,836,737 A | 6/1989 | Holmes et al. | |
| 4,857,494 A | 8/1989 | Martinez et al. | |
| 4,891,458 A | 1/1990 | Innes et al. | |
| 4,894,215 A | 1/1990 | Kawakubo et al. | |
| 4,894,354 A | 1/1990 | Martinez et al. | |
| 4,968,405 A | 11/1990 | Wachter | |
| 5,013,699 A | 5/1991 | Vassilakis et al. | |
| 5,051,385 A | 9/1991 | Wachter | |
| 5,057,296 A | 10/1991 | Beck | |
| 5,061,147 A | 10/1991 | Nespor | |
| 5,095,169 A | 3/1992 | Skeels et al. | |
| 5,102,643 A | 4/1992 | Kresge et al. | |
| 5,116,794 A | 5/1992 | Skeels et al. | |
| 5,134,242 A | 7/1992 | Le et al. | |
| 5,134,243 A | 7/1992 | Bhore et al. | |
| 5,160,033 A | 11/1992 | Vassilakis et al. | |
| 5,200,058 A | 4/1993 | Beck et al. | |
| 5,207,892 A | 5/1993 | Vassilakis et al. | |
| 5,208,197 A | 5/1993 | Vassilakis et al. | |
| 5,221,648 A | 6/1993 | Wachter | |
| 5,232,580 A | 8/1993 | Le et al. | |
| 5,254,327 A | 10/1993 | Martinez et al. | |
| 5,256,277 A | 10/1993 | Del Rosi et al. | |

(Continued)

FOREIGN PATENT DOCUMENTS

| | | |
|---|---|---|
| JP | 2002128517 | 5/2002 |
| JP | 2004143026 | 5/2004 |
| KR | 1020080106806 | 12/2008 |
| WO | 0117901 | 3/2001 |
| WO | 0138223 | 5/2001 |
| WO | 2005102964 | 11/2005 |
| WO | 2006031259 | 3/2006 |
| WO | 2006/038912 | 4/2006 |
| WO | 2010/083488 | 7/2010 |

OTHER PUBLICATIONS

European Search Report and Written Opinion in related European Patent Application No. 13736356 dated Oct. 20, 2015; 10 pages.

(Continued)

*Primary Examiner* — Elizabeth Wood
(74) *Attorney, Agent, or Firm* — Hovey Williams LLP

(57) ABSTRACT

Mesoporous X and A zeolites and methods for production thereof are disclosed herein. Such mesoporous zeolites can be prepared by contacting an initial zeolite with an acid in conjunction with a mesopore forming agent. The initial zeolite can have a framework silicon-to-aluminum content in the range of from about 1 to about 2.5. Additionally, such mesoporous zeolites can have a total 20 to 135 Å diameter mesopore volume of at least 0.05 cc/g.

24 Claims, 4 Drawing Sheets

(56) References Cited

U.S. PATENT DOCUMENTS

| | | |
|---|---|---|
| 5,258,570 A | 11/1993 | Skeels et al. |
| 5,260,501 A | 11/1993 | Bhore et al. |
| 5,288,393 A | 2/1994 | Jessup et al. |
| 5,308,475 A | 5/1994 | Degnan et al. |
| 5,344,553 A | 9/1994 | Shih |
| 5,347,060 A | 9/1994 | Hellring et al. |
| 5,360,774 A | 11/1994 | Martinez et al. |
| 5,391,433 A | 2/1995 | Kawakubo et al. |
| 5,393,718 A | 2/1995 | Skeels et al. |
| 5,401,384 A | 3/1995 | Martinez et al. |
| 5,458,929 A | 10/1995 | Earls et al. |
| 5,510,431 A | 4/1996 | Earls et al. |
| 5,538,710 A | 7/1996 | Guo et al. |
| 5,601,798 A | 2/1997 | Cooper et al. |
| 5,614,453 A | 3/1997 | Occelli |
| 5,628,978 A | 5/1997 | Tejada et al. |
| 5,636,437 A | 6/1997 | Kaschmitter et al. |
| 5,659,099 A | 8/1997 | Skeels et al. |
| 5,662,965 A | 9/1997 | Deguchi et al. |
| 5,672,556 A | 9/1997 | Pinnavaia et al. |
| 5,712,402 A | 1/1998 | Pinnavaia et al. |
| 5,744,673 A | 4/1998 | Skeels et al. |
| 5,770,040 A | 6/1998 | Tejada et al. |
| 5,785,946 A | 7/1998 | Pinnavaia et al. |
| 5,786,294 A | 7/1998 | Sachtler et al. |
| 5,795,559 A | 8/1998 | Pinnavaia et al. |
| 5,800,800 A | 9/1998 | Pinnavaia et al. |
| 5,800,801 A | 9/1998 | Tejada |
| 5,840,264 A | 11/1998 | Pinnavaia et al. |
| 5,840,271 A | 11/1998 | Carrazza et al. |
| 5,849,258 A | 12/1998 | Lujano et al. |
| 5,855,864 A | 1/1999 | Pinnavaia et al. |
| 5,858,457 A | 1/1999 | Brinker et al. |
| 5,892,080 A | 4/1999 | Alberti et al. |
| 5,902,564 A | 5/1999 | Lujano et al. |
| 5,952,257 A | 9/1999 | Tejada et al. |
| 5,958,367 A | 9/1999 | Ying et al. |
| 5,958,624 A | 9/1999 | Frech et al. |
| 5,961,817 A | 10/1999 | Wachter et al. |
| 5,985,356 A | 11/1999 | Schultz et al. |
| 5,993,768 A | 11/1999 | Zappelli et al. |
| 6,004,617 A | 12/1999 | Schultz et al. |
| 6,015,485 A | 1/2000 | Shukis et al. |
| 6,022,471 A | 2/2000 | Wachter et al. |
| 6,024,899 A | 2/2000 | Peng et al. |
| 6,027,706 A | 2/2000 | Pinnavaia et al. |
| 6,087,044 A | 7/2000 | Iwase et al. |
| 6,096,828 A | 8/2000 | DePorter et al. |
| 6,106,802 A | 8/2000 | Lujano et al. |
| 6,139,721 A | 10/2000 | Baldiraghi et al. |
| 6,162,414 A | 12/2000 | Pinnavaia et al. |
| 6,193,943 B1 | 2/2001 | Pinnavaia et al. |
| 6,204,424 B1 | 3/2001 | Yadav et al. |
| 6,248,691 B1 | 6/2001 | Gadkaree et al. |
| 6,297,293 B1 | 10/2001 | Bell et al. |
| 6,299,855 B1 | 10/2001 | Lujano et al. |
| 6,319,872 B1 | 11/2001 | Manzer et al. |
| 6,334,988 B1 | 1/2002 | Gallis et al. |
| 6,391,278 B1 | 5/2002 | Pinnavaia et al. |
| 6,410,473 B1 | 6/2002 | Pinnavaia et al. |
| 6,413,489 B1 | 7/2002 | Ying et al. |
| 6,413,902 B1 | 7/2002 | Pinnavaia et al. |
| 6,419,820 B1 | 7/2002 | Bogdan et al. |
| 6,476,085 B2 | 11/2002 | Manzer et al. |
| 6,476,275 B2 | 11/2002 | Schmidt et al. |
| 6,485,702 B1 | 11/2002 | Lujano et al. |
| 6,489,168 B1 | 12/2002 | Wang et al. |
| 6,495,487 B1 | 12/2002 | Bogdan |
| 6,515,845 B1 | 2/2003 | Oh et al. |
| 6,524,470 B1 | 2/2003 | Kasztelan et al. |
| 6,538,169 B1 | 3/2003 | Pittman et al. |
| 6,541,539 B1 | 4/2003 | Yang et al. |
| 6,544,923 B1 | 4/2003 | Ying et al. |
| 6,548,440 B1 | 4/2003 | Pham et al. |
| 6,558,647 B2 | 5/2003 | Lacombe et al. |
| 6,580,003 B2 | 6/2003 | Deng et al. |
| 6,583,186 B2 | 6/2003 | Moore, Jr. |
| 6,585,948 B1 | 7/2003 | Ryoo |
| 6,585,952 B1 | 7/2003 | Pinnavaia et al. |
| 6,592,764 B1 | 7/2003 | Stucky et al. |
| 6,620,402 B2 | 9/2003 | Jacobsen et al. |
| 6,623,967 B1 | 9/2003 | Willson, III |
| 6,649,413 B1 | 11/2003 | Schultz et al. |
| 6,656,443 B2 | 12/2003 | Klett |
| 6,669,924 B1 | 12/2003 | Kaliaguine et al. |
| 6,689,336 B2 | 2/2004 | Kanno |
| 6,702,993 B2 | 3/2004 | Pinnavaia et al. |
| 6,706,169 B2 | 3/2004 | Pinnavaia et al. |
| 6,706,659 B2 | 3/2004 | Gillespie et al. |
| 6,710,003 B2 | 3/2004 | Jan et al. |
| 6,746,659 B2 | 6/2004 | Pinnavaia et al. |
| 6,756,515 B2 | 6/2004 | Rende et al. |
| 6,762,143 B2 | 7/2004 | Shan et al. |
| 6,770,258 B2 | 8/2004 | Pinnavaia et al. |
| 6,793,911 B2 | 9/2004 | Koegler et al. |
| 6,797,153 B1 | 9/2004 | Fukuyama et al. |
| 6,797,155 B1 | 9/2004 | Chester et al. |
| 6,800,266 B2 | 10/2004 | Pinnavaia et al. |
| 6,809,061 B2 | 10/2004 | Bogdan et al. |
| 6,811,684 B2 | 11/2004 | Mohr et al. |
| 6,814,943 B2 | 11/2004 | Radcliffe et al. |
| 6,818,589 B1 | 11/2004 | Gillespie |
| 6,833,012 B2 | 12/2004 | Rogers |
| 6,841,143 B2 | 1/2005 | Inagaki et al. |
| 6,843,906 B1 | 1/2005 | Eng |
| 6,843,977 B2 | 1/2005 | Pinnavaia et al. |
| 6,846,546 B2 | 1/2005 | Kuroda et al. |
| 6,866,925 B1 | 3/2005 | Chane-Ching |
| 6,869,906 B2 | 3/2005 | Pinnavaia et al. |
| 6,936,234 B2 | 8/2005 | Bilenko |
| 6,998,104 B2 | 2/2006 | Tao et al. |
| 7,084,087 B2 | 8/2006 | Shan et al. |
| 7,589,041 B2 | 9/2009 | Ying et al. |
| 7,807,132 B2 | 10/2010 | Garcia-Martinez |
| 7,976,696 B2 | 7/2011 | Ying et al. |
| 8,007,663 B2 | 8/2011 | Ying et al. |
| 8,008,223 B2 | 8/2011 | Garcia-Martinez |
| 2001/0031241 A1 | 10/2001 | Lacombe et al. |
| 2001/0042440 A1 | 11/2001 | Miyazawa et al. |
| 2003/0054954 A1 | 3/2003 | Chane-Ching et al. |
| 2004/0067842 A1 | 4/2004 | Pinnavaia et al. |
| 2004/0138051 A1 | 7/2004 | Shan et al. |
| 2004/0179996 A1 | 9/2004 | Shan et al. |
| 2005/0074396 A1 | 4/2005 | Takahashi et al. |
| 2005/0130827 A1 | 6/2005 | Schunk |
| 2005/0214539 A1 | 9/2005 | Ying et al. |
| 2006/0078487 A1 | 4/2006 | Endo et al. |
| 2007/0244347 A1 | 10/2007 | Ying et al. |
| 2008/0138274 A1 | 6/2008 | Garcia-Martinez |
| 2008/0214882 A1 | 9/2008 | Pinnavaia et al. |
| 2008/0227628 A1 | 9/2008 | Le Van Mao |
| 2009/0110631 A1 | 4/2009 | Garcia-Martinez |
| 2010/0190632 A1 | 7/2010 | Dight |
| 2010/0196263 A1 | 8/2010 | Garcia-Martinez |
| 2011/0118107 A1 | 5/2011 | Garcia-Martinez |
| 2011/0171121 A1 | 7/2011 | Senderov |

OTHER PUBLICATIONS

Tao, Yousheng et al., Synthesis of Mesoporous Zeolite A by Resorcinol—Formaldehyde Aerogel Templating, Langmuir, 2005, 21, pp. 504-507.

International search Report and Written Opinion dated Apr. 30, 2013 for co-pending PCT Application No. PCT/US2013/021420, filed Jan. 14, 2013, 10 pages.

Tao et al., Synthesis of Mesoporous Zeolite A by Resorcinol—Formaldehyde Aerogel Templating, Langmuir 2005, vol. 21, No. 2, pp. 504-507, Dec. 17, 2004.

Al-Khattaf, S. et al., The Role of Diffusion in Alkyl-Benzenes Catalytic Cracking, Appl. Catal. A: Gen. 226; 139-153, (2002).

Bagri, R. et al.; Catalytic Pyrolysis of Polyethylene; Anal. Pyrolysis, 63:29-41 (2002).

(56) References Cited

OTHER PUBLICATIONS

Conway, B.E., Electrochemical Supercapacitors, Kluwer Academic/Plenum Publishers, New York, 1999, pp. 11-22, 51-63, 125-135, 183-219, 221-224, 255, 335-338, 337-415, 417-440, 598, 602, 615, and 649-666.
Corma, A., From Microporous to Mesoporous Molecular Sieve Materials and Their Use in Catalysis, Chem. Rev., 97:2373-2419, (1997).
CSIC NM014-Method of Preparation of Mesoporous Alumina with High Thermal Stability, http://www.serina.es/escaparate/verproducto.cgi?idproducto=4980&refcompra=NULO, downloaded May 9, 2007, 2 pages.
Davis, M.E., Ordered Porous Materials for Emerging Applications, Nature, 417:813-821 (2002).
Davis, M.E., Zeolite and Molecular Sieve Synthesis, Chem. Mater., 4:756-768 (1992).
De Moor, P-P.E.A. et al., Imaging the Assembly Process of the Organic-Mediated Synthesis of a Zeolite, Chem. Eur. J., 5(7):2083-2088 (1999).
Degnan, T.F. et al., History of ZSM-5 Fluid Catalytic Cracking Additive Development at Mobile, Microporous Mesoporous Mater., 35-36:245-252 (2000).
De A.A. Soler-Illia, Galo, J. et al., Chemical Strategies to Design Textured Materials from Microporous and mesoporous Oxides to Nanonetworks and Hierarchial Structures, Chem. Rev. 102:4093-4138 (2002).
Galo, J. de A. A. et al., Chemical Strategies to Design Textured Materials: from Microporous and Mesoporous Oxides to Nanonetworks and Hierarchical Structures, Chern. Rev., 2002, 102, 4093-4138.
Geidel, E. et al., Characterization of Mesoporous Materials by Vibrational Spectroscopic Techniques, Microporous and Mesoporous Mater., 65:31-42 (2003).
Gonzalez-Pena, V. et al., Thermally Stable Mesoporous Alumina Synthesized with Non-ionic Surfaces in teh Presence of Amines, Microporous and Mesoporous Materials, 44-45, pp. 203-210 (2001).
Goto, Y., Mesoporous Material from Zeolite, Journal of Porous Materials, 9, 2002, pp. 43-48.
Grieken, Rafael et al., Supercritical Fluid Extraction of a Nonionic Surfactant Template from SBA-15 Materials and Consequences on the Porous Structure, Langmuir 2003, 19, 3966-3973, American Chemical Society, Rey Juan Carlos University, Madrid, Spain, University of California, Santa Barbara, California.
Grudzien, Rafal M. et al., Effective Method for Removal of Polymeric Template from SBA-16 Silica Combining Extraction and Temperaure-controlled Calcination, The Royal Society of Chemistry, 2006, J. Mater. Chem., 2006, 16, 819-823.
Harding, R.H. et al., New Developments in FCC Catalyst Technology, Appl. Catal. A:Gen. 221:389-396 (2001).
Huang, L. et al., Investigation of Synthesizing MCM-41/ZSM Composites, J. Phys. Chem. B. 104:2817-2823 (2000).
Iijima, S., Carbon Nanotubes: Past, Present, and Future, Physica B: Condensed Matter, www.elsevier.com/locate/physb, 2002, 323, pp. 1-5.
International Search Report and Written Opinion dated Nov. 7, 2005 from International Patent Application No. PCT/US2005/05918, filed Feb. 25, 2005.
Joo, S.H., et al., Ordered Nanoporous Arrays of Carbon Supporting High Dispersions of Platinum Nanoparticles, Letters to Nature, www.nature.com, Macmillan Magazines Ltd., Nature, vol. 412, Jul. 12, 2001, pp. 169-172.
Karlsson A. et al., Composites of Micro- and Mesoporous Materials: Simultaneous Syntheses of MFI/MCM-41 Like Phases by a Mixed Template Approach, Microporous and mesoporous Mater, 27: 181-192 (1999).
Kloestra, K.R. et al., Mesoporous Material Containing Framework Tectosilicate by Pore-Wall Recrystallization, Chem. Commun., 23:2281-2282 (1997).
Kyotani, T., Control of Pore Structure in Carbon, Carbon, Institute for Chemical Reaction Science, Tohoku University, 2-1-1, Kaiahira, Sendai 980-8577, Japan, Jun. 1, 1999, ElSevier Science Ltd., pp. 269-286.
Lee, H. et al., Materials Science: On the Synthesis of Zeolites, ScienceWeek, downloaded from http://www.scienceweek.com/2003/sa031031-1.htm on Apr. 23, 2005, 5 pages.
Lin, C. et al., Carbonization and Activation of Sol-gel Derived Carbon Xerogels, Carbon, Department of Chemical Engineering, University of South Carolina, Colombia, SC, Aug. 2, 1999, Elsevier Science Ltd., pp. 849-861.
Linssen, T. et al., Mesoporous Templated Silicates: An Overview of Their Synthesis, Catalytic Activation and Evaluation of the Stability, Advances in Colloid and Interface Science, 103:121-147 (2003).
Liu, Y. et al., Steam-Stable MSU-S Aluminosilicate Mesostructures Assembled from Zeolite ZSM-5 and Zeolite Beta Seeds, Angew. Chem. Int. Ed., 7:1255-1258 (2001).
Liu, Y. et al., Aluminosilicate Mesostructures with Improved Acidity and Hydrothermal Stability, J. Mater. Chem., 12:3179-3190 (2002).
Lyons, D.M. et al., Preparation of Ordered Mesoporous Ceria with Enhanced Thermal Stability, The Journal of Materials Chemistry, vol. 12, pp. 1207-1212 (2002).
Mendes, M.F. et al., Optimization of the Process of Concentration of Vitamin E from DDSO using Supercritical $CO_2$, Brazilian Journal of Chemical Engineering, vol. 22, No. 01, pp. 83-91, Jan.-Mar. 2005.
Moller, K. et al., Synthesis of Ordered Mesoporous Methacrylate Hybrid Systems: Hosts for Molecular Polymer Composites, Department of Chemistry, Purdue University, West Lafayette, IN, American Chemical Society, Dec. 28, 1998, pp. 665-673.
Ogura, M. et al., Formation of Uniform Mesopores in ZSM-5 Zeolite through Treatment in Alkaline Solution, Chemistry Letters 2000, pp. 882-883.
On, D.T. et al., Large-Pore Mesoporous Materials with Semi-Crystalline Zeolitic Frameworks, Angew. Chem. Int. Ed., 17:3248-3251 (2001).
Park, D.W. et al., Catalytic Degration of Polyethylene Over Solid Acid Catalysts, Polym. Degrad. Stabil., 65:193-198 (1999).
Patarin, J. et al., Mild Methods for Removing Organic Templates from Inorganic Host Materials, Highlights, Angew. Chem. Int. Ed. 2004, 43:3878-3880.
Prokesova, P. et al., Preparation of Nanosized Micro/Mesoporous Composites via Simultaneous Synthesis of Beta/MCM-48 Phases, Microporous and Mesoporous Materials 64 (2003) pp. 165-174.
Ryoo, R. et al., Synthesis of Highly Ordered Carbon Molecular Sieves via Template-Mediated Structural Transformation, The Journal of Physical Chemistry B, vol. 103, No. 38, Sep. 16, 1999, pp. 7743-7746.
Scherzer, J. et al., Octane-Enhancing Zeolitic FCC Catalysts—Scientific and Technical Aspects, Marcel Dekker, Inc., 42 pages, (1990).
Storck, S. et al., Characterization of Micro- and Mesoporous Solids by Physisorption Methods and Pore-Size Analysis, Applied Catalysts A: Gen. 17:137-146 (1998).
Tao et al., Mesopore-Modified Zeolites: Preparation, Characterization, and Applications, Chem. Rev., vol. 106, pp. 896-910 (2006).
Triantafyllidis K.S. et al., Gas-oil Cracking Activity of Hydrothermally Stable Aluminosilicate Mesostructures (MSU-S) Assembled from Zeolite Seeds: Effect of the Type of Framework Structure and Porosity, Catalyst Today, vol. 112, pp. 33-36 (2006).
Verhoef, M. J. et al., Partial Transformation of MCM-41 Material into Zeolites: Formation of Nanosized MFI Type Crystallites, Chemical Materials, 2001, vol. 13, pp. 683-687.
Yang, P. et al., Generalized Syntheses of Large-Pore Mesoporous Metal Oxides with Semicrystalline Frameworks, Nature, vol. 396, Nov. 12, 1998, pp. 152-155; www.nature.com.
Ying, J. Y. et al., Synthesis and Applications of Supramolecular-Templated Mesoporous Materials, Angew. Chem. Int. Ed., 38:56-77 (1999).
Zhang, Z. et al, Mesoporous Aluminosilicates with Ordered Hexagonal Structure, Strong Acidity, and Extraordinary Hydrothermal Stability at High Temperatures, J. of the American Chem. Society, 2001, vol. 123, pp. 5014-5021.

(56) References Cited

OTHER PUBLICATIONS

Poladi, Raja H.P.R. et al., Synthesis, Characterization, and Catalytic Properties of a Microporous/Mesoporous Material, MMM-1, Journal of Solid State Chemistry, 2002, vol. 167, pp. 363-369.

Xia, Yongde et al., On the synthesis and characterization of ZSM-5/MCM-48 aluminosilicate composite materials, Journal of the Royal Society of Chemistry, 2004, pp. 863-870.

Guo et al., Characterization of Beta/MCM-41 Composite Molecular Sieve Compared with the Mechanical Mixture Microporous and Mesoporous Materials, vol. 44-45; pp. 427-434, 2001.

Tao et al., ZSM-5 Monolith of Uniform Mesoporous Channels, Material Sciences, Chiba University, J. Am. Chem. Soc., Japan 2003, pp. 6044-6045.

INTRODUCTION OF MESOPOROSITY INTO LOW SILICA ZEOLITES

RELATED APPLICATIONS

This application claims priority benefit under 35 U.S.C. Section 119(e) to U.S. Provisional Patent Ser. No. 61/586,493, filed on Jan. 13, 2012, the entire disclosure of which is incorporated herein by reference.

BACKGROUND

1. Field

The present invention relates generally to enhancing mesoporosity in zeolites.

2. Description of Related Art

U.S. Patent Application Publication No. 2007/0244347, for example, describes a method for introducing mesoporosity into zeolites. Prior to treatment, these zeolites, such as ultrastable zeolite Y ("USY") CBV 720 provided by Zeolyst International, have a high silicon-to-aluminum ratio ("Si/Al") and low extra-framework content. As previously described, these zeolites can be treated in the presence of a pore forming agent (e.g., a surfactant) at a controlled pH under a set of certain time and temperature conditions in order to introduce mesoporosity into the zeolites. Thereafter, the mesostructured material can be treated to remove the pore forming agent. Although advances have been made in the art of introducing mesoporosity into zeolites, improvements are still needed.

SUMMARY

One embodiment of the present invention concerns a composition comprising: a mesoporous zeolite, where the mesoporous zeolite is a zeolite A, and where the mesoporous zeolite has a total 20 to 135 Å diameter mesopore volume of at least 0.05 cc/g.

Another embodiment of the present invention concerns a method of forming a material comprising a mesoporous zeolite. The method of this embodiment comprises: (a) contacting an initial zeolite with a mesopore forming agent thereby forming a first treatment mixture comprising the initial zeolite and the mesopore forming agent; and (b) introducing an acid into the first treatment mixture thereby forming a second treatment mixture comprising the mesoporous zeolite, the mesopore forming agent, and the acid. Furthermore, in this embodiment the initial zeolite has a framework silicon-to-aluminum ratio ("Si/Al") in the range of from about 1 to about 2.5.

Still another embodiment of the present invention concerns a method of forming a material comprising a mesoporous zeolite. The method of this embodiment comprises: contacting a zeolite having a framework silicon-to-aluminum ratio in the range of from about 1 to about 2.5 with a surfactant and an acid to thereby produce the mesoporous zeolite, where the mesoporous zeolite has a total 20 to 135 Å diameter mesopore volume of at least 0.05 cc/g.

BRIEF DESCRIPTION OF THE DRAWING FIGURES

Embodiments of the present invention are described herein with reference to the following drawing figures, wherein.

DETAILED DESCRIPTION

Figure 1:
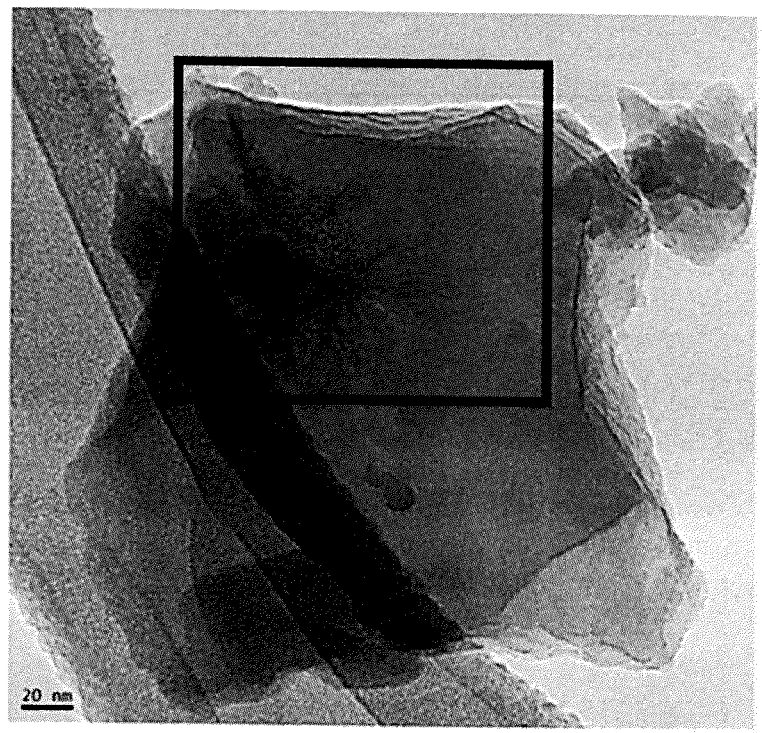
FIG. 1 is a transmission electron micrograph ("TEM") of a Na-A zeolite employed as the starting material in Example 1.

Various embodiments of the present invention concern methods for preparing a material containing a mesoporous zeolite. In one or more embodiments, the mesoporous zeolite can be prepared by contacting an initial zeolite with a mesopore forming agent in conjunction with an acid. The resulting mesoporous zeolite can then be subject to various post-treatment procedures and/or be employed in a variety of applications.

As just mentioned, an initial zeolite can be employed as a starting material in preparing a mesoporous zeolite. In one or more embodiments, the initial zeolite can be a non-mesostructured zeolite. In other various embodiments, the initial zeolite can be a non-mesoporous zeolite. As used herein, the term "non-mesoporous" shall denote a composition having a total volume of less than 0.05 cc/g of 20 to 135 Å diameter mesopores. In various embodiments, the initial zeolite starting materials can have a total 20 to 135 Å diameter mesopore volume of less than 0.01 cc/g. Additionally, suitable initial zeolites can have a total 0 to 20 Å micropore volume of at least 0.1 cc/g, at least 0.2 cc/g, or at least 0.3 cc/g. Furthermore, the initial zeolite can have an average unit cell size of at least 24.40, at least 24.45, or at least 24.50 Å. Additionally, in various embodiments, the initial zeolite can be present as a component of a composite material. Such composite materials can further include, for example, one or more binder material components.

In various embodiments, the initial zeolite can have a low framework silicon-to-aluminum ratio ("Si/Al"). For example, the initial zeolite can have a framework Si/Al ratio of less than 30, less than 25, less than 20, less than 15, less than 10, less than 5, less than 3, or 2.5 or less. Additionally, the initial zeolite can have a framework Si/Al ratio in the range of from about 1 to about 30, in the range of from about 1 to about 25, in the range of from about 1 to about 20, in the range of from about 1 to about 15, in the range of from about 1 to about 10, in the range of from about 1 to about 5, in the range of from about 1 to about 3, in the range of from about 1 to about 2.5, or in the range of from 1 to 2.5. Note that, as used herein, the silicon-to-aluminum ratio refers to the elemental ratio (i.e., silicon atoms to aluminum atoms) of the zeolite; this is in contrast to another commonly used parameter, the silica-to-alumina ratio (i.e., $SiO_2/Al_2O_3$) of the zeolite. Generally, the Si/Al of a zeolite can be determined via bulk chemical analysis. This method, however, does not distinguish between framework aluminum atoms and extra-framework aluminum ("EFAL") atoms in the zeolite. As will be understood by those of ordinary skill in the art, the framework Si/Al can be determined by a combination of methods, such as using both bulk chemical analysis and aluminum-27 nuclear magnetic resonance ("$^{27}$Al NMR") and/or silicon-29 nuclear magnetic resonance ("$^{29}$Si NMR"). In various embodiments described herein, the framework Si/Al can be determined by known methods in the art. For example, a combination of bulk chemical analysis and $^{27}$Al NMR can be employed for determining the framework Si/Al of the zeolite.

In various embodiments, the initial zeolite can have a 1-dimensional, 2-dimensional, or 3-dimensional pore structure. Additionally, the initial zeolite can exhibit long-range crystallinity. Materials with long-range crystallinity include all solids with one or more phases having repeating structures, referred to as unit cells, that repeat in a space for at least 10 nm. A long-range crystalline zeolite may have, for example, single crystallinity, mono crystallinity, or multi crystallinity. Furthermore, in various embodiments, the initial zeolite can be substantially crystalline. Additionally, the initial zeolite can be a one-phase hybrid material.

The type of zeolite suitable for use as the initial zeolite is not particularly limited. However, in one or more embodiments, the initial zeolite can be selected from the group consisting of zeolite A, faujasite (e.g., zeolites X and Y; "FAU"), mordenite ("MOR"), CHA, ZSM-5 ("MFI"), ZSM-12, ZSM-22, beta zeolite, synthetic ferrierite (e.g., ZSM-35), synthetic mordenite, and mixtures of two or more thereof. In certain embodiments, the initial zeolite can be selected from the group consisting of zeolite A and zeolite X. In further embodiments, the initial zeolite can be a zeolite A. Examples of suitable zeolites A include, but are not limited to, Na-A, NH$_4$-A, Ca-A, Li-A, K-A, Ag-A, Ba-A, Cu-A, and mixtures of two or more thereof. In other embodiments, the initial zeolite can be a zeolite X. Examples of suitable zeolites X include, but are not limited to, Na—X, NH$_4$—X, Ca—X, Li—X, K—X, Ag—X, Ba—X, Cu—X, and mixtures of two or more thereof.

In one or more embodiments, the initial zeolite can optionally be combined with water to form an initial slurry. The water useful in forming the initial slurry can be any type of water. In various embodiments, the water employed in forming the optional initial slurry can be deionized water. In one or more embodiments, the initial zeolite can be present in the optional initial slurry in an amount in the range of from about 1 to about 50 weight percent, in the range of from about 5 to about 40 weight percent, in the range of from about 10 to about 30 weight percent, or in the range of from about 15 to about 25 weight percent. In certain embodiments, the optional initial slurry can comprise the initial zeolite in an amount of about 20 weight percent.

As noted above, the initial zeolite (optionally as part of an initial slurry) can be contacted with a mesopore forming agent, which thereby forms an initial treatment mixture comprising the initial zeolite and mesopore forming agent. Any now known or hereafter discovered mesopore forming agents may be employed in the various embodiments described herein. In one or more embodiments, the mesopore forming agent can include a surfactant. In certain embodiments, a cationic surfactant can be employed. In various embodiments, the surfactant employed can comprise one or more alkyltrimethyl ammonium salts and/or one or more dialkyldimethyl ammonium salts. In certain embodiments, the surfactant can be selected from the group consisting of cetyltrimethyl ammonium bromide ("CTAB"), cetyltrimethyl ammonium chloride ("CTAC"), and mixtures thereof. Other suitable mesopore foiiiiing agents include, but are not limited to, non-ionic surfactants, polymers (e.g., block copolymers), and soft templates. In another embodiment, the surfactant comprises a non-ionic surfactant.

In various embodiments, the pH of the resulting initial treatment mixture can optionally be adjusted. For example, the pH of the resulting initial treatment mixture can be adjusted to fall within the range of from about 4 to about 8, or in the range of from about 5 to about 7. Various pH adjusting agents (e.g., acids or bases) may be employed during this optional pH adjustment step. In various embodiments, the pH of the initial treatment mixture can optionally be adjusted with an acid. Any known organic or inorganic acid can be employed for optionally adjusting the pH of the initial treatment mixture. Examples of acids suitable for use in adjusting the pH of the initial treatment mixture can include, but are not limited to, hydrochloric acid, nitric acid, sulfuric acid, formic acid, acetic acid, sulfonic acid, and oxalic acid.

Following formation of the initial treatment mixture, whose pH has optionally been adjusted, an acid can be introduced into the initial treatment mixture thereby forming a second treatment mixture comprising the acid, the mesopore forming agent, and the zeolite. Though not wishing to be bound by theory, it is believed that treatment of the initial zeolite in this treatment mixture with the mesopore forming agent and the acid can cause a plurality of mesopores to form in the zeolite, thereby resulting in a mesoporous zeolite. In various embodiments, the acid employed in this step of the formation process can be a dealuminating acid. In further embodiments, the acid can also be a chelating agent. Examples of acids suitable for use include, but are not limited to, hydrochloric acid, sulfuric acid, nitric acid, acetic acid, sulfonic acid, oxalic acid, citric acid, ethylenediaminetetraacetic acid, tartaric acid, malic acid, glutaric acid, succinic acid, and mixtures of two or more thereof.

In various embodiments, the amount of acid employed in the initial treatment mixture can be in the range of from about 1 to about 10 milliequivalents per gram of the above-described initial zeolite, or in the range of from about 2 to about 6 milliequivalents. Additionally, the acid can be added to the initial treatment mixture by any methods known or hereafter discovered in the art. In various embodiments, the acid can be added to the initial treatment mixture over a period of time. For example, the acid can be added to the initial treatment mixture over a period of time in the range of from about 5 minutes to about 10 hours, in the range of from about 10 minutes to about 5 hours, or in the range of from about 30 minutes to about 2 hours. Furthermore, in various embodiments, the acid can be added drop-wise to the initial treatment mixture.

It should be noted that, in various embodiments, the order of addition of the acid and the mesopore forming agent can be reversed. In other words, in certain embodiments, the initial zeolite can first be contacted with an acid followed by being contacted with a mesopore forming agent. In still other embodiments, the acid and mesopore forming agent can be combined prior to contact with the initial zeolite, thereby providing simultaneous or substantially simultaneous contact with the initial zeolite. Regardless of the order of addition, the above-described reagents, concentration ratios, and conditions may still be employed. Additionally, in various embodiments, the above-described processes can be performed in the absence or substantial absence of a base.

Irrespective of the formation procedure, the resulting second treatment mixture can be agitated for a period of time. Any methods of agitation known or hereafter discovered in the art can be employed. For example, stirring, shaking, rolling, and the like may be employed to agitate the resulting second treatment mixture. In one or more embodiments, the second treatment mixture can be agitated for a period of time ranging from about 1 minute to about 24 hours, from about 5 minutes to about 12 hours, from about 10 minutes to about 6 hours, or from about 30 minutes to about 2 hours.

Following treatment with the above-described acid and mesopore forming agent, at least a portion of the resulting mesoporous zeolite can be recovered from the second treatment mixture. Recovery of the mesoporous zeolite can be performed by any solid/liquid separation techniques known or hereafter discovered in the art. For instance, the second treatment mixture can be subjected to filtration. In various embodiments, the recovered mesoporous zeolite can be washed (e.g., with deionized water) one or more times. Optionally, the mesoporous zeolite can be filtered again after washing.

Once the mesoporous zeolite has been recovered from the second treatment mixture, it can be contacted with a base. Any base known or hereafter discovered can be employed in the various embodiments described herein for treating the recovered mesoporous zeolite. In various embodiments, the base can be selected from the group consisting of NaOH, $NH_4OH$, KOH, $Na_2CO_3$, TMAOH, and mixtures thereof. In one or more embodiments, treatment of the mesoporous zeolite with a base can be performed under elevated temperature conditions. As used herein, the term "elevated temperature" shall denote any temperature greater than room temperature. In various embodiments, contacting the mesoporous zeolite with a base can be performed at a temperature in the range of from about 30 to about 200° C., in the range of from about 50 to about 150° C., or at about 80° C. Additionally, the amount of base employed can be such that the base is present at a ratio with the initial quantity of the initial zeolite (described above) in the range of from greater than 0 to about 20 mmol per gram of initial zeolite, in the range of from about 0.1 to 20 mmol per gram of initial zeolite, or in the range of from 0.5 to 10 mmol per gram of initial zeolite. Furthermore, treatment with the base can be performed over a period of time. For example, treatment of the mesoporous zeolite with a base can be performed over a period of time in the range of from about 1 minute to about 2 days, in the range of from about 30 minutes to about 1 day, or in the range of from about 2 hours to about 12 hours.

Following treatment with a base, at least a portion of the mesoporous zeolite can be separated from the basic treatment mixture. For example, the mesoporous zeolite can be filtered, washed, and/or dried. In one or more embodiments, the zeolite can be filtered via vacuum filtration and washed with water. Thereafter, the recovered mesoporous zeolite can optionally be filtered again and optionally dried.

Following the filter, wash, and drying steps, the zeolite can be subjected to additional heat treatment or chemical extraction in order to remove or recover any remaining mesopore forming agent. In one or more embodiments, the mesopore forming agent (e.g., surfactant) can be removed by calcining the zeolite in nitrogen at a temperature in the range of from about 500 to about 600° C. followed by calcining the zeolite in air. The mesopore forming agent removal technique is selected based on, for example, the time needed to remove all of the mesopore forming agent from the mesoporous zeolite. The total time period employed for heat treatment of the mesoporous zeolite can be in the range of from about 30 minutes to about 24 hours, or in the range of from 1 to 12 hours.

In various embodiments, the resulting mesoporous zeolite can be subjected to one or more post-formation treatments. Suitable post-formation treatments are described, for example, in U.S. Patent Application Publication No. 2007/0244347, which is incorporated herein by reference in its entirety. In certain embodiments, the mesoporous zeolite can be subjected to one or more post-formation treatments selected from the group consisting of calcination, ion exchange, steaming, incorporation into an adsorbent, incorporation into a catalyst, re-alumination, silicon incorporation, incorporation into a membrane, and combinations of two or more thereof. Suitable ion exchange procedures for the resulting mesoporous zeolite include, but are not limited to, ammonium ion exchange, rare earth ion exchange, lithium ion exchange, potassium ion exchange, calcium ion exchange, and combinations of two or more thereof.

The resulting mesoporous zeolite can have long-range crystallinity, or be substantially crystalline, and can include mesopore surfaces defining a plurality of mesopores. As used herein, the terms "long-range crystallinity" and "substantially crystalline" are substantially synonymous, and are intended to denote solids with one or more phases having repeating structures, referred to as unit cells, that repeat in a space for at least 10 nm. Furthermore, a cross-sectional area of each of the plurality of mesopores can be substantially the same. Additionally, in one or more embodiments the mesoporous zeolite can be a mesostructured zeolite.

In various embodiments, the mesoporous zeolite can have a total 20 to 135 Å diameter mesopore volume of at least 0.05, 0.06, 0.07, 0.08, 0.09, 0.10, 0.11, 0.12, 0.13, 0.14, 0.15, 0.20, or 0.25 cc/g. Additionally, the mesoporous zeolite can have a total 20 to 135 Å diameter mesopore volume in the range of from about 0.05 to about 0.70 cc/g, in the range of from about 0.10 to about 0.60 cc/g, in the range of from about 0.15 to about 0.50 cc/g, or in the range of from 0.20 to 0.40 cc/g.

In various embodiments, the mesoporous zeolite can have a total 0 to 20 Å diameter micropore volume in the range of from about 0 to about 0.40 cc/g, in the range of from about 0.01 to about 0.35 cc/g, in the range of from about 0.02 to about 0.30 cc/g, or in the range of from about 0.03 to about 0.25 cc/g.

In various embodiments, the resulting mesoporous zeolite can have a total 20 to 135 Å diameter mesopore volume that is at least 5, at least 10, at least 20, at least 30, at least 40, at least 50, at least 60, at least 70, at least 80, at least 90, at least 100, at least 200, at least 300, at least 400, or at least 500 percent greater than the 20 to 135 Å diameter mesopore volume of the above-described initial zeolite. Furthermore, the mesoporous zeolite can have a total 20 to 135 Å diameter mesopore volume that is at least 0.02, at least 0.04, at least 0.05, at least 0.06, at least 0.07, at least 0.08, at least 0.09, at least 0.1, at least 0.2, at least 0.3, at least 0.4, or at least 0.5 cc/g greater than the total 20 to 135 Å diameter mesopore volume of the initial zeolite.

In various embodiments, the mesoporous zeolite can have a framework Si/Al of less than 50, less than 45, less than 40, less than 35, less than 30, less than 25, less than 20, less than 15, less than 10, less than 5, less than 3, or less than 2.5. Additionally, the mesoporous zeolite can have a framework Si/Al in the range of from about 1 to about 30, in the range of from about 1 to about 25, in the range of from about 1 to about 20, in the range of from about 1 to about 15, in the range of from about 1 to about 10, in the range of from about 1 to about 5, in the range of from about 1 to about 3, or in the range of from about 1 to about 2.5.

In one or more embodiments, the mesoporous zeolite can have a crystalline content of at least 10, at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent, as measured by X-ray diffraction ("XRD").

As noted above, the initial zeolite can be selected from X and/or A zeolites. Accordingly, in various embodiments, the mesoporous zeolite can be a zeolite A, which can be selected from the group consisting of Na-A, $NH_4$-A, Ca-A, Li-A, K-A, Ag-A, Ba-A, Cu-A, and mixtures of two or more thereof. In other embodiments, the mesoporous zeolite can be a zeolite X, which can be selected from the group consisting of Na—X, $NH_4$—X, Ca—X, Li—X, K—X, Ag—X, Ba—X, Cu—X, and mixtures of two or more thereof.

Applications

The unique structure of mesoporous zeolites can be useful to a variety of fields and should address certain limitations associated with conventional zeolites. As catalysis is an important field of application for zeolites, special emphasis is placed on the catalytic applications of mesoporous zeolites.

The combination of a mesostructure, high surface-area, and controlled pore or interior thickness as measured between adjacent mesopores should provide for access to bulky molecules and reduce the intracrystalline diffusion barriers. Thus, enhanced catalytic activity for bulky molecules should be observed using mesoporous zeolites, as compared to conventional zeolites. Catalytic cracking is selectivity and/or efficiency limited because diffusion is limited by the small pore size of the zeolite H—Y. Because the conventional unconverted zeolite crystal has limited diffusion, it is difficult for an initial reaction product (e.g., 1,3-diisopropyl benzene) to exit the zeolite. As a result, over cracking occurs and light compounds are formed resulting in excess formation of undesirable products, such as cumene, benzene, and coke. In contrast to catalytic cracking with the unmodified conventional zeolite H—Y, the larger pore size, the controlled mesopore volume, and the controlled interior or pore wall thickness present in the mesoporous zeolite facilitates the exit of desired products (i.e., 1,3-diisopropyl benzene) from the mesostructure, and over cracking that produces cumene, benzene, and coke is avoided. As a result, there is a higher conversion of the desired product, 1,3-diisopropyl benzene.

Acid catalysts with well-defined ultra-large pores are highly desirable for many applications, especially for catalytic cracking of the gas oil fraction of petroleum, whereby slight improvements in catalytic activity or selectivity would translate to significant economic benefits. More than 135 different zeolitic structures have been reported to date, but only about a dozen of them have commercial applications, mostly zeolites with 3-D (3-dimensional) pore structures. The incorporation of 3-D mesopores may be beneficial for zeolites with 1-D and 2-D pore structures as it would greatly facilitate intracrystalline diffusion. Zeolites with 1-D and 2-D pore structures are not widely used, because the pore structure is less then optimal.

Pyrolysis of plastics has gained renewed attention due to the possibility of converting these abundant waste products into valuable chemicals while also producing energy. Acidic catalysts, such as zeolites, have been shown to be able to reduce significantly the decomposition temperature of plastics and to control the range of products generated. However, the accessibility of the bulky molecules produced during plastic degradation has been severely limited by the micropores of zeolites. The use of mesoporous zeolites can allow for reduced decomposition temperatures compared to unmodified commercial zeolites.

With their improved accessibility and diffusivity compared to conventional zeolites, mesoporous zeolites may also be employed in place of unmodified conventional zeolites in other applications, such as, for example, gas and liquid-phase adsorption, separation, catalysis, catalytic cracking, catalytic hydrocracking, catalytic isomerization, catalytic hydrogenation, catalytic hydroformilation, catalytic alkylation, catalytic acylation, ion-exchange, water treatment, and pollution remediation. Many of these applications suffer currently from limitations associated with the small pores of zeolites, especially when bulky molecules are involved. Mesoporous zeolites present attractive benefits over zeolites in such applications.

Organic dye and pollutant removal from water is of major environmental importance, and represents the third major use of zeolites (accounting for 80 tons of zeolites per year). However, most of the organic dyes are bulky, which make their removal slow or incomplete, requiring a huge excess of zeolites in the process. Mesoporous zeolites offer significant advantage over unmodified conventional zeolites in organic dye and pollutant removal with their larger surface area and pore size.

Application in Petrochemical Processing

The mesoporous zeolites can have one or more of controlled pore volume, controlled pore size (e.g., cross sectional area and/or diameter), and controlled pore shape. Hydrocarbon reactions, including petrochemical processing, are mass-transfer limited. Accordingly, a mesoporous catalyst with controlled pore volume, pore size, and/or pore shape can facilitate transport of the reactants to and within active catalyst sites within the mesoporous catalyst and transport the products of the reaction out of the catalyst. Mesoporous zeolites enable processing of very large or bulky molecules, with dimensions of, for example, from about 2 to about 60 nm, from about 5 to about 50 nm, and from about 30 to about 60 nm.

Hydrocarbon and/or petrochemical feed materials that can be processed with the mesoporous zeolites include, for example, a gas oil (e.g., light, medium, or heavy gas oil) with or without the addition of resids. The feed material can include thermal oils, residual oils, (e.g., atmospheric tower bottoms ("ATB"), heavy gas oil ("HGO"), vacuum gas oil ("VGO"), and vacuum tower bottoms ("VTB"), cycle stocks, whole top crudes, tar sand oils, shale oils, synthetic fuels (e.g., products of Fischer-Tropsch synthesis), heavy hydrocarbon fractions derived from the destructive hydrogenation of coal, tar, pitches, asphalts, heavy crude oils, sour crude oils, metal-laden crude oils, and waxy materials, including, but not limited to, waxes produced by Fischer-Tropsch synthesis of hydrocarbons from synthesis gas. Hydrotreated feedstocks derived from any of the above described feed materials may also be processed by using the mesoporous zeolitic materials.

Heavy hydrocarbon fractions from crude oil contain most of the sulfur in crude oils, mainly in the form of mercaptans, sulfides, disulfides, thiophenes, benzothiophenes, dibenzothiophenes, and benzonaphthothiophenes, many of which are large, bulky molecules. Similarly, heavy hydrocarbon fractions contain most of the nitrogen in crude oils, principally in the for n of neutral N-compounds (e.g., indole and carbazole), basic N-compounds (e.g., pyridine, quinoline, acridine, and phenenthridine), and weakly basic N-compounds (e.g., hydroxipyridine and hydroxiquinoline) and their substituted H-, alkyl-, phenyl- and naphthyl-substituted derivatives, many of which are large, bulky materials. Sulfur and nitrogen species can be removed for production of clean fuels and resids or deeper cut gas oils with high metals content can also be processed using the mesoporous zeolites described herein.

In various embodiments, the mesoporous zeolites can be employed in chemical processing operations including, for example, catalytic cracking, fluidized catalytic cracking, hydrogenation, hydrosulfurization, hydrocracking, hydroisomerization, oligomerization, alkylation, or any of these in combination. Any of these chemical processing operations may be employed to produce, for example, a petrochemical product by reacting a petrochemical feed material with the mesoporous zeolites described herein.

In various embodiments, the mesoporous zeolite can be used as an additive to other catalysts and/or other separation materials including, for example, a membrane, an adsorbent, a filter, an ion exchange column, an ion exchange membrane, or an ion exchange filter.

In various embodiments, the mesoporous zeolite can be used alone or in combination as an additive to a catalyst. The mesoporous zeolite can be added at from about 0.05 to about 100 weight percent to the catalyst. The additive may be employed in chemical processing operations including, for example, catalytic cracking, fluidized catalytic cracking, hydrogenation, hydrosulfurization, hydrocracking, hydroisomerization, oligomerization, alkylation, or any of these in combination. For example, the addition of small amounts of mesoporous zeolites and/or crystalline nanostructured zeolites to conventional commercially available FCC catalysts allows for improvement in the catalytic performance.

Generally, FCC uses an FCC catalyst, which is typically a fine powder with a particle size of about 10 to 200 microns. The FCC catalyst can be suspended in the feed and propelled upward into a reaction zone. A relatively heavy hydrocarbon or petrochemical feedstock (e.g., a gas oil) can be mixed with the FCC catalyst to provide a fluidized suspension. The feedstock can be cracked in an elongated reactor, or riser, at elevated temperatures to provide a mixture of petrochemical products that are lighter hydrocarbon products than were provided in the feedstock. Gaseous reaction products and spent catalyst are discharged from the riser into a separator where they can be regenerated. Typical FCC conversion conditions employing FCC catalysts include a riser top temperature of about 500 to about 595° C., a catalyst/oil weight ratio of about 3 to about 12, and a catalyst residence time of about 0.5 to about 15 seconds. The higher activity of the mesoporous zeolites can enable less severe processing conditions, such as, for example, lower temperature, lower catalyst to oil ratios, and/or lower contact time.

In various embodiments, a small amount of mesoporous zeolite blended with conventional FCC catalysts can enable pre-cracking of the bulkier molecules. Conventional FCC catalysts have pore sizes too small to accommodate bulkier molecules. After the bulkier molecules have been pre-cracked they are processed in the small pores of the conventional FCC catalyst.

In various embodiments, mesoporous zeolites can be blended with conventional catalysts. The additive mesoporous zeolites can be incorporated into the conventional catalyst pellet. Shaped (e.g., pelletized) mesoporous materials can be mixed with the catalyst pellet. Alternatively, a conventional catalyst and the mesoporous zeolites can be layered together. Any such mixture can be used in a refining application, for example, in fluidized catalytic cracking directly as is done with other additives. The amount of mesoporous zeolite added and the manner by which it is blended can be used to tune the yield and/or the structure of the products.

In one or more embodiments, the addition of or incorporation of mesoporous zeolites to conventional commercially available Thermofor Catalytic Cracking ("TCC") catalysts can provide an improvement in the catalytic performance. The TCC process is a moving bed process that uses pellet or bead shaped conventional catalysts having an average particle size of about one-sixty-fourth to one-fourth inch. Hot catalyst beads progress with a hydrocarbon or petrochemical feedstock downwardly through a cracking reaction zone. The hydrocarbon products are separated from the spent catalyst and recovered. The catalyst is recovered at the lower end of the zone and recycled (e.g., regenerated). Typically, TCC conversion conditions include an average reactor temperature from about 450 to about 510° C., a catalyst/oil volume ratio of from about 2 to about 7, and a reactor space velocity of from about 1 to about 2.5 vol/hr/vol. Mesoporous zeolites can be substituted for TCC catalysts to improve the catalytic cracking of petrochemical or hydrocarbon feedstocks to petroleum product. Alternatively, the mesoporous zeolites can be blended with the TCC catalyst.

In various embodiments, mesoporous zeolites can be used as catalyst additives in any other catalytic application. For example, they may be used as additives in processes where bulky molecules must be processed.

In other various embodiments, mesoporous zeolites can be used in hydrogenation. Conventional zeolites are good hydrogenation supports because they possess a level of acidity needed both for the hydrogenation of the aromatic compounds and for tolerance to poisons such as, for example, sulfur. However, the small pore size of conventional zeolites limit the size of the molecules that can be hydrogenated. Various metals, such as Pt, Pd, Ni, Co, Mo, or mixtures of such metals, can be supported on mesoporous zeolites using surface modification methods, for example, ion exchange, described herein. The hydrogenation catalytic activity of mesoporous zeolties modified to support various metals (e.g., doped with metals) shows a higher hydrogenation activity for bulky aromatic compounds as compared to other conventional materials, for example, metal supported on alumina, silica, metal oxides, MCM-41, and conventional zeolites. The mesoporous zeolites modified to support various metals also show, compared to conventional materials, a higher tolerance to sulfur including, for example, sulfur added as thiophene and dibenzothiophene, which are common bulky components of crude oil that often end up in gas oil fractions.

In other various embodiments, mesoporous zeolites can be used in hydrodesulfurization ("HDS"), including, for example, deep HDS and hydrodesulfurization of 4,6-dialkyldibenzothiophenes. Deep removal of sulfur species from gas oil has two main limitations: i) the very low reactivity of some sulfur species, for example, dimethyldibenzothiophenes and ii) the presence of inhibitors in the feedstocks such as, for example, $H_2S$. Deep HDS is currently done with active metal sulfides on alumina, silica/alumina, and alumina/zeolite.

Generally, during HDS the feedstock is reacted with hydrogen in the presence of an HDS catalyst. Any oxygen, sulfur, and nitrogen present in the feed is reduced to low levels. Aromatics and olefins are also reduced. The HDS reaction conditions are selected to minimize cracking reactions, which reduce the yield of the most desulfided fuel product. Hydrotreating conditions typically include a reaction temperature from about 400 to about 900° F., a pressure between 500 to 5,000 psig, a feed rate (LHSV) of 0.5 $hr^{-1}$ to 20 hr$^{-1}$ (v/v), and overall hydrogen consumption of 300 to 2,000 scf per barrel of liquid hydrocarbon feed (53.4-356 m3 H$_2$/m$^3$ feed).

Suitable active metal sulfides include, for example, Ni and Co/Mo sulfides. Zeolites provide strong acidity, which improves HDS of refractory sulfur species through methyl group migration. Zeolites also enhance the hydrogenation of neighboring aromatic rings. Zeolite acidity enhances the liberation of H$_2$S from the metal sulfide increasing the tolerance of the catalyst to inhibitors. However, bulky methylated polyaromatic sulfur species are not able to access the acidic sites of conventional zeolites. In contrast, the controlled mesoporosity and strong acidity of mesoporous zeolites provide accessibility to the acidic sites and acidity that allows for the deeper HDS required for meeting future environmental restrictions.

In other various embodiments, mesoporous zeolites can be used in hydrocracking. Metals, including noble metals such as, for example, Ni, Co, W, and Mo, and metal compounds are commercially used in hydrocracking reactions. These metals can be supported on mesoporous zeolites by previously described methods. The mesoporous zeolites including metals can be employed for hydrocracking of various feedstocks such as, for example, petrochemical and hydrocarbon feed materials.

Typically, hydrocracking involves passing a feedstock (i.e., a feed material), such as the heavy fraction, through one or more hydrocracking catalyst beds under conditions of elevated temperature and/or pressure. The plurality of catalyst beds may function to remove impurities such as any metals and other solids. The catalyst beads also crack or convert the longer chain molecules in the feedstock into smaller ones. Hydrocracking can be effected by contacting the particular fraction or combination of fractions with hydrogen in the presence of a suitable catalyst at conditions, including temperatures in the range of from about 600 to about 900° F. and at pressures from about 200 to about 4,000 psia, using space velocities based on the hydrocarbon feedstock of about 0.1 to 10 hr$^{-1}$.

As compared to conventional unmodified catalyst supports such as, for example, alumina, silica, and zeolites, the mesoporous zeolites including metals allow for the hydrocracking of higher boiling point feed materials. The mesoporous zeolites including metals produce a low concentration of heteroatoms and a low concentration of aromatic compounds. The mesoporous zeolites including metals exhibit bifunctional activity. The metal, for example a noble metal, catalyzes the dissociative adsorption of hydrogen and the mesoporous zeolite provides the acidity.

The controlled pore size and controlled mesopore surface in the mesoporous zeolites including metals can make the bifunctional activity more efficient compared to a bifunctional conventional catalyst. In addition to the zeolitic acidity present in the mesoporous zeolites, the controlled pore size enables larger pores that allow for a high dispersion of the metal phase and the processing of large hydrocarbons.

In other embodiments, mesoporous zeolites can be used in hydroisomerization. Various metals and mixtures of metals, including, for example, noble metals such as nickel or molybdenum and combinations thereof in, for example, their acidic form, can be supported on mesoporous zeolites.

Typically, hydroisomerization is used to convert linear paraffins to branched paraffins in the presence of a catalyst in a hydrogen-rich atmosphere. Hydroisomerization catalysts useful for isomerization processes are generally bifunctional catalysts that include a dehydrogenation/hydrogenation component and an acidic component. Paraffins can be exposed to mesoporous zeolites including metals and be isomerized in hydrogen at a temperature ranging from about 150 to about 350° C. to thereby produce branched hydrocarbons and high octane products. The mesoporous zeolites including metals permit hydroisomerization of bulkier molecules than is possible with commercial conventional catalysts due, at least in part, to their controlled pore size and pore volume.

In other embodiments, mesoporous zeolites can be used in the oligomerization of olefins. The controlled pore shape, pore size, and pore volume improves the selectivity properties of the mesoporous zeolites. The selectivity properties, the increased surface area present in the mesospore surfaces, and the more open structure of the mesoporous zeolites can be used to control the contact time of the reactants, reactions, and products inside the mesoporous zeolites. The olefin can contact the mesoporous zeolites at relatively low temperatures to produce mainly middle-distillate products via olefin-oligomerization reactions. By increasing the reaction temperature, gasoline can be produced as the primary fraction.

Where the mesoporous zeolites are used in FCC processes, the yield of olefins production can be increased relative to FCC with conventional zeolites. The increased yield of olefins can be reacted by oligomerization in an olefin-to-gasoline-and/or-diesel process, such as, for example, MOGD (Mobile Olefins to Gas and Diesel, a process to convert olefins to gas and diesel). In addition, olefins of more complex structure can be oligomerized using the mesoporous zeolites described herein.

The LPG fraction produced using mesoporous zeolites has a higher concentration of olefins compared to other catalysts, including, for example, various conventional FCC catalysts, zeolites, metals oxides, and clays under catalytic cracking conditions both in fixed bed and fluidized bed reactor conditions. The mesopore size of the mesoporous zeolites readily allows the cracked products to exit the mesoporous zeolites. Accordingly, hydrogen transfer reactions are reduced and the undesired transformation of olefins to paraffins in the LPG fraction is reduced. In addition, over-cracking and coke formation are limited, which increases the average life time of the catalyst.

The controlled pore size, pore volume, and mesopore surfaces provide an open structure in the mesotructured zeolites. This open structure reduces the hydrogen transfer reactions in the gasoline fraction and limits the undesired transformation of olefins and naphthenes into paraffins and aromatics. As a result, the octane number (both RON and MON) of the gasoline produced using the mesoporous zeolites is increased.

The acidity and the controlled mesoporosity present in the mesoporous zeolites can enable their use in alkylation reactions. Specifically, olefins and paraffins react in the presence of the mesoporous zeolites to produce highly branched octanes. The highly branched octane products readily exit the open structure of the mesoporous zeolites, thereby minimizing unwanted olefin oligomerization.

In other embodiments, the mesoporous zeolites can be used to process a petrochemical feed material to petrochemical product by employing any of a number of shape selective petrochemical and/or hydrocarbon conversion processes. In one embodiment, a petrochemical feed can be contacted with the mesoporous zeolite under reaction conditions suitable for dehydrogenating hydrocarbon compounds. Generally, such reaction conditions include, for example, a temperature of from about 300 to about 700° C., a pressure from about 0.1 to about 10 atm, and a WHSV from about 0.1 to about 20 hr$^{-1}$.

In other embodiments, a petrochemical feed can be contacted with the mesoporous zeolites under reaction conditions suitable for converting paraffins to aromatics. Generally, such reaction conditions include, for example, a temperature of from about 300 to about 700° C., a pressure from about 0.1 to about 60 atm, a WHSV of from about 0.5 to about 400 hr$^{-1}$, and an H$_2$/HC mole ratio of from about 0 to about 20.

In other embodiments, a petrochemical feed can be contacted with the mesoporous zeolites under reaction conditions suitable for converting olefins to aromatics. Generally, such reaction conditions include, for example, a temperature of from about 100 to about 700° C., a pressure from about 0.1 to about 60 atm, a WHSV of from about 0.5 to about 400 hr$^{-1}$, and an H$_2$/HC mole ratio from about 0 to about 20.

In other embodiments, a petrochemical feed can be contacted with the mesoporous zeolites under reaction conditions suitable for isomerizing alkyl aromatic feedstock components. Generally, such reaction conditions include, for example, a temperature of from about 230 to about 510° C., a pressure from about 3 to about 35 atm, a WHSV of from about 0.1 to about 200 hr$^{-1}$, and an H$_2$/HC mole ratio of from about 0 to about 100.

In other embodiments, a petrochemical feed can be contacted with the mesoporous zeolites under reactions conditions suitable for disproportionating alkyl aromatic components. Generally, such reaction conditions include, for example, a temperature ranging from about 200 to about 760° C., a pressure ranging from about 1 to about 60 atm, and a WHSV of from about 0.08 to about 20 hr$^{-1}$.

In other embodiments, a petrochemical feed can be contacted with the mesoporous zeolites under reaction conditions suitable for alkylating aromatic hydrocarbons (e.g., benzene and alkylbenzenes) in the presence of an alkylating agent (e.g., olefins, formaldehyde, alkyl halides, and alcohols). Generally, such reaction conditions include a temperature of from about 250 to about 500° C., a pressure from about 1 to about 200 atm, a WHSV of from about 2 to about 2,000 hr$^{-1}$, and an aromatic hydrocarbon/alkylating agent mole ratio of from about 1/1 to about 20/1.

In other embodiments, a petrochemical feed can be contacted with the mesoporous zeolites under reaction conditions suitable for transalkylating aromatic hydrocarbons in the presence of polyalkylaromatic hydrocarbons. Generally, such reaction conditions include, for example, a temperature of from about 340 to about 500° C., a pressure from about 1 to about 200 atm, a WHSV of from about 10 to about 1,000 hr$^{-1}$, and an aromatic hydrocarbon/polyalkylaromatic hydrocarbon mole ratio of from about 1/1 to about 16/1.

Generally, suitable conditions for a petrochemical or hydrocarbon feed to contact the mesoporous zeolites include temperatures ranging from about 100 to about 760° C., pressures ranging from above 0 to about 3,000 psig, a WHSV of from about 0.08 to about 2,000 hr$^{-1}$, and a hydrocarbon compound mole ratio of from 0 to about 100.

Application in Compound Removal

The microporosity, mesoporosity, and ion exchange properties present in the mesoporous zeolites can enable removal of inorganic and organic compounds from solutions. Suitable solutions can be aqueous or organic solutions. Accordingly, the mesoporous zeolites can be employed in water treatment, water purification, pollutant removal, and/or solvent drying. Other configurations such as fixed bed, filters, and membranes can be also used in addition to the mesoporous zeolites. Optionally, mesoporous zeolites can be employed as additives with conventional separation means including, for example, fixed bed, filters, and membranes.

The mesoporous zeolites can also be substituted for other separation means in, for example, fixed bed, filters, and membranes. The mesoporous zeolites can be recycled by ion exchange, drying, calcinations, or other conventional techniques and reused.

Application in Adsorption

The mesoporous zeolites can be used to adsorb gaseous compounds including, for example, volatile organic compounds ("VOCs"), which are too bulky to be adsorbed by conventional unmodified zeolites. Accordingly, pollutants that are too bulky to be removed by conventional unmodified zeolites can be removed from a gaseous phase by direct adsorption. Mesoporous zeolites can be employed for adsorption in various adsorption configurations such as, for example, membranes, filters and fixed beds. Adsorbed organic compounds can be desorbed from the mesoporous zeolites by heat treatment. Thus, the mesoporous zeolites can be recycled and then reused.

Application in Gas Separation

Mesoporous zeolites can be grown on various supports by employed techniques such as, for example, seeding, hydrothermal treatment, dip coating, and/or use of organic compounds. They can be physically mixed with conventional zeolites or metal oxides. Continuous layers of mesoporous zeolites can be used as membranes and/or catalytic membranes on, for example, porous supports. Mesoporous zeolites are unique molecular sieves containing both microporosity and mesoporosity. They may be employed in various configurations including, for example, membranes for separation of gases based on physicochemical properties such as, for example, size, shape, chemical affinity, and physical properties.

Application in Fine Chemicals and Pharmaceuticals

A mesoporous zeolite has increased active site accessibility as compared to the same zeolite in conventional form. Accordingly, the activity of some important chemical reactions used in fine chemical and pharmaceutical production can be improved by substituting a conventional zeolite used in the process for a mesoporous zeolite. In addition, a mesoporous zeolite may be employed as an additive to a catalyst typically employed in such fine chemical and pharmaceutical production reactions. Suitable processes that can be improved by using a mesoporous zeolite include, for example, isomerization of olefins, isomerization of functionalized saturated systems, ring enlargement reactions, Beckman rearrangements, isomerization of arenes, alkylation of aromatic compounds, acylation of arenes, ethers, and aromatics, nitration and halogenation of aromatics, hydroxylation of arenes, carbocyclic ring formation (including Diels-Alder cycloadditions), ring closure towards heterocyclic compounds, amination reactions (including amination of alcohols and olefins), nucleophilic addition to epoxides, addition to oxygen-compounds to olefins, esterification, acetalization, addition of heteroatom compounds to olefins, oxidation/reduction reactions such as, but not limited to, Meerwein-Ponndorf-Verley reduction and Oppenauer oxidation, dehydration reactions, condensation reactions, C—C formation reactions, hydroformylation, acetilization, and amidation.

Application in Slow Release Systems

Chemicals and/or materials having useful properties such as, for example, drugs, pharmaceuticals, fine chemicals, optic, conducting, semiconducting magnetic materials, nanoparticles, or combinations thereof, can be introduced to mesoporous zeolites using one or more modifying methods. For example, chemicals and/or materials may be incorporated into the mesoporous zeolites by, for example, adsorption or ion exchange. In addition, such useful chemicals can be combined with the mesoporous zeolites by creating a physical mixture, a chemical reaction, heat treatment, irradiation, ultrasonication, or any combination thereof.

The release of the chemicals and/or materials having useful properties can be controlled. Controlled release may take place in various systems such as, for example, chemical reactions, living organisms, blood, soil, water, and air. The controlled release can be accomplished by physical reactions or by chemical reactions. For example, controlled release can be accomplished by chemical reactions, pH variation, concentration gradients, osmosis, heat treatment, irradiation, and/or magnetic fields.

Kits

One or more embodiments also provide kits for conveniently and effectively implementing various methods described herein. Such kits can comprise any of the mesoporous zeolites described herein, and a means for facilitating their use consistent with various methods. Such kits may provide a convenient and effective means for assuring that the methods are practiced in an effective manner. The compliance means of such kits may include any means that facilitate practicing one or more methods associated with the zeolites described herein. Such compliance means may include instructions, packaging, dispensing means, or combinations thereof. Kit components may be packaged for either manual or partially or wholly automated practice of the foregoing methods. In other embodiments involving kits, a kit is contemplated that includes block copolymers, and optionally instructions for their use.

EXAMPLES

The following examples are intended to be illustrative of the present invention in order to teach one of ordinary skill in the art to make and use the invention and are not intended to limit the scope of the invention in any way.

Example 1

Riving of Na-A Zeolite

Three inventive zeolite samples were prepared by adding a cetyltrimethyl ammonium chloride ("CTAC") solution (30% concentration, 0.4 g CTAC on dry basis per 1 g of Na-A zeolite) to a 20% Na-A slurry in deionized ("DI") water. A 10% HCl solution was then added to adjust the pH of the slurry to ~5.0. A citric acid solution (10% concentration, 2, 4, and 6 meq/g zeolite) was then dripped in over 1 hour while the mixture was magnetically stirred. The slurry was stirred for another hour and subsequently filtered and washed with DI water. The cake was then placed into a concentrated $NH_4OH$ solution (29% concentration, 1.5 mL/g of Na-A) and heated at 80° C. for overnight.

In comparative experiments, three samples were prepared by adjusting the pH of a Na-A slurry in DI water as described above to 5.0 and a citric acid solution (2, 4, and 6 meq/g) was dripped in over 1 hour, followed by stirring for another hour. The zeolite was filtered and washed. The cake was then placed into a CTAC solution and, after 15 minutes, concentrated $NH_4OH$ was added (29% concentration, 1.5 mL/g of Na-A). The mixture was then heated at 80° C. for overnight.

TABLE 1

Comparison of Riving Procedures for Na-A Zeolites

| Comparative | | | | | Inventive | | | | |
| --- | --- | --- | --- | --- | --- | --- | --- | --- | --- |
| Acid (meq/g) | % Crystal. | UCS | 0-20 | 20-135 | Acid (meq/g) | % Crystal. | UCS | 0-20 | 20-135 |
| 2 | 75 | 24.59 | 0 | 0.03 | 2 | 93 | 24.63 | 0.26 | 0.06 |
| 4 | 62 | 24.63 | 0 | 0.05 | 4 | 75 | 24.63 | 0.12 | 0.14 |
| 6 | 40 | 24.60 | 0 | 0.04 | 6 | 31 | 24.56 | 0 | 0.24 |

Table 1 depicts the results of the Argon pore-size distribution ("POSD," analyzed on a Quantachrome Quadrasob SI Surface Area and Pore Size Analyzer, the surfactant templates were removed in situ during the outgassing sample preparation before the analysis) and x-ray diffraction ("XRD," collected on a PANalytical Cubix Pro X-ray Diffractometer, samples containing surfactant templates were analyzed following the ASTM 3942 method, and the starting Na-A was used as the crystallinity standard) analyses, which show that the comparative samples (i.e., those rived in a base with CTAC after 2, 4, and 6 meq/g citric acid washes) showed no increasing mesoporosity with increasing acid wash severity, while the samples rived by the inventive procedure (i.e., adding CTAC during the acid treatment step) do show increasing mesoporosity with increasing acid wash severity.

Figure 2:
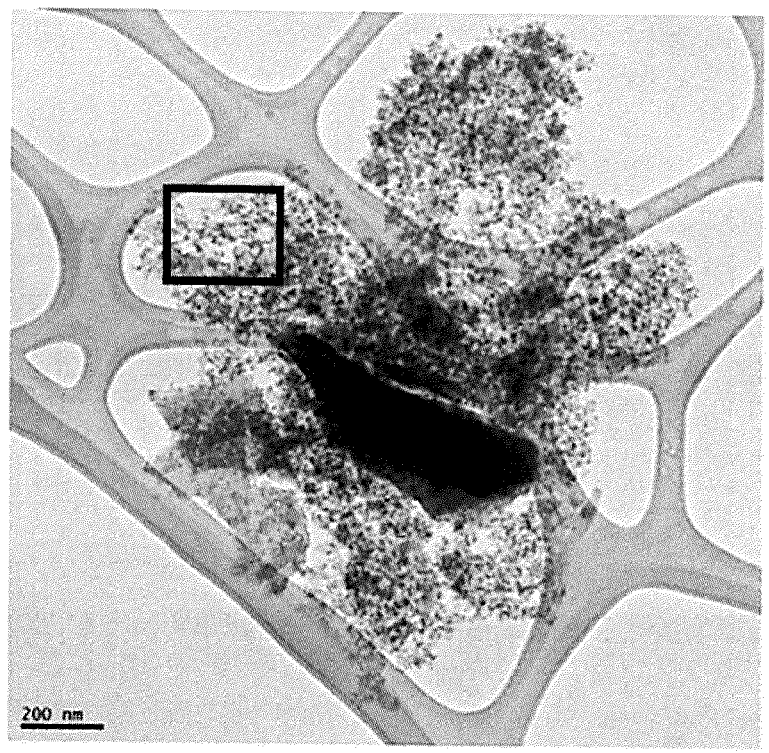
FIG. 2 is a TEM of a comparative sample of a conventionally rived Na-A zeolite prepared in Example 1, particularly illustrating crystal break-up of the rived zeolite.
Figure 3:
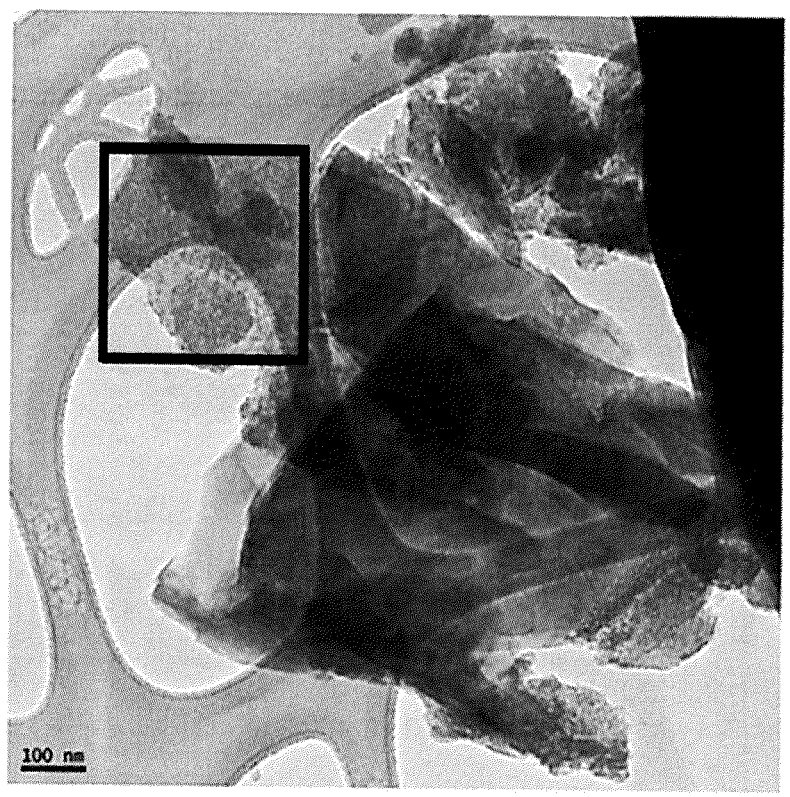
FIG. 3 is a TEM of an inventive sample of a rived Na-A zeolite prepared in Example 1 according to inventive procedures, particularly illustrating retained crystal integrity of the rived zeolite.

TEM analysis also showed that the samples treated by the comparative riving procedure exhibit significant breaking up of the crystals, while the samples rived by the inventive procedure suffer much less from this problem (FIGS. 1-3). FIG. 1 depicts the initial Na-A zeolite, while FIGS. 2 and 3 compare the comparative zeolite treated with 4 meq/g of acid and the inventive zeolite treated with 4 meq/g of acid, respectively. As can be seen looking at FIGS. 2 and 3, the inventive zeolite exhibited reduced crystal break-up compared to the comparative zeolite.

Example 2

Riving of Na-A Zeolite

Another three inventive zeolite samples were prepared by adding a CTAC solution (30% concentration, 0.4 g CTAC on dry basis per 1 g of Na-A zeolite) to a 20% Na-A slurry in DI water. A 10% HCl solution was then added to adjust the pH of the slurry to ~7.0. A citric acid solution (10% concentration, 2, 4, and 6 meq/g zeolite) was then dripped in over 1.5 hours while the mixture was magnetically stirred. The slurry was stirred for another 1.5 hours and subsequently filtered and washed with DI water. The cake was then reslurried in DI water to make a 20% solid in water slurry, and then a NaOH solution (50%, 0.05 g/g of Na-A) was added. The mixture was then heated without agitation at 80° C. for overnight.

In comparative experiments, three samples were prepared by adjusting the pH of a Na-A slurry in DI water as described above to 7.0, and a citric acid solution (10% concentration, 2, 4, and 6 meq/g Na-A zeolite) was dripped in over 1.5 hours, followed by stirring for another 1.5 hours. The zeolite was filtered and washed. The cake was then reslurried in DI water to make a 20% solid in water slurry. A CTAC solution (30%, 0.4 g CTAC on dry basis per 1 g of Na-A zeolite) was then added. After 15 minutes, a NaOH (50%, 0.05 g/g Na-A) solution was added and the mixture was heated at 80° C. for overnight.

TABLE 2

Comparison of Riving Procedures for Na-A Zeolites

| Comparative | | | | | Inventive | | | | |
|---|---|---|---|---|---|---|---|---|---|
| Acid (meq/g) | % Crystal. | UCS | 0-20 | 20-135 | Acid (meq/g) | % Crystal. | UCS | 0-20 | 20-135 |
| 2 | 81 | 24.61 | 0 | 0.03 | 2 | 90 | 24.62 | 0 | 0.02 |
| 4 | 68 | 24.60 | 0 | 0.04 | 4 | 71 | 24.61 | 0 | 0.07 |
| 6 | 45 | 24.59 | 0 | 0.06 | 6 | 48 | 24.58 | 0.02 | 0.20 |

Table 2 depicts the POSD and XRD analyses, which were measured as described in Example 1. Table 2 shows that the comparative samples (i.e., those rived in a base with CTAC after 2, 4, and 6 meq/g citric acid washes) showed only slightly increasing mesoporosity with increasing acid wash severity, while the samples rived by the inventive procedure (i.e., adding CTAC during the acid treatment step) showed more obvious increasing mesoporosity with increasing acid wash severity. It should be noted that no microporosity was observed due to the very slow diffusion kinetics of argon into the 4 A (Na-A) zeolites in both the comparative and inventive samples.

Example 3

Riving of Na—X Zeolite

Another three inventive zeolite samples were prepared by adding a CTAC solution (30% concentration, 0.4 g CTAC on dry basis per 1 g of Na—X zeolite) to a 20% Na—X slurry in DI water. A 10% HCl solution was then added to adjust the pH of the slurry to ~7.0. A citric acid solution (10% concentration, 2, 4 and 6 meq/g zeolite) was then dripped in over 1.5 hours while the mixture was magnetically stirred. The slurry was stirred for another 1.5 hours and filtered and washed with DI water. The cake was then reslurried in DI water to make a 20% solid in water slurry, and then a NaOH solution (50%, 0.1 g/g of Na—X) was added. The mixture was then heated without agitation at 80° C. for overnight.

In comparative experiments, three samples were prepared by adjusting the pH of a Na—X slurry in DI water as described above to ~7.0. A citric acid solution (10% concentration, 2, 4, and 6 meq/g Na—X zeolite) was dripped in over 1.5 hours, followed by stirring for another 1.5 hours. The zeolite was filtered and washed. The cake was then reslurried in DI water to make a 20% solid in water slurry. A CTAC solution (30%, 0.4 g CTAC on dry basis per 1 g of Na—X zeolite) was added. After 15 minutes, a NaOH (50%, 0.1 g/g Na—X) solution was added and the mixture was heated at 80° C. for overnight.

TABLE 3

Comparison of Riving Procedures for Na-X Zeolites

| Comparative | | | | | Inventive | | | | |
|---|---|---|---|---|---|---|---|---|---|
| Acid (meq/g) | % Crystal. | UCS | 0-20 | 20-135 | Acid (meq/g) | % Crystal. | UCS | 0-20 | 20-135 |
| 2 | 95 | 24.97 | 0.39 | 0.03 | 2 | 90 | 24.98 | 0.35 | 0.06 |
| 4 | 75 | 25.00 | 0.31 | 0.14 | 4 | 75 | 24.97 | 0.34 | 0.10 |
| 6 | 55 | 24.94 | 0.21 | 0.06 | 6 | 59 | 24.96 | 0.29 | 0.16 |

Table 3 depicts the POSD and XRD analyses, which were measured as described in Example 1. Table 3 shows how that the comparative samples (i.e., those rived in a base with CTAC after 2, 4, and 6 meq/g citric acid washes) showed no significant mesoporosity except for the 4 meq/g acid treated sample, while the samples rived by the inventive procedure (i.e., adding CTAC during the acid treatment step) showed a more clear trend of increasing mesoporosity with increasing acid wash severity that was observed for other zeolites such as A and Y.

Example 4

Adsorbent Properties of Rived NaX Zeolites

In this example, the adsorption effectiveness of Rived NaX zeolites was observed.

Zeolites, which are typically a few hundred nanometers to a few micrometers in size, cannot be used directly in adsorptive separation or testing because the pressure drop through the compacted bed would be too high. Therefore, the tested zeolites were mixed with some kind of "adhesive," e.g., clay, and compressed or extruded to form a certain shape and size. After experimenting with different formulations and particle forming processes, it was found that a mixture of 80 wt % of hydrated zeolite and 20 wt % of hydrated Attagel 50 with an additional 10-25 wt % of DI water can be pressed using a hydraulic press at a pressure of ~12,000 to 15,000 psi to form reasonably strong pressed pellets, which can then be carefully calcined at 650° C. for 2 hours under flowing dry air to set the binder (i.e., Attagel 50). The pressed pellets are then crushed in a grinder and sieved to the desirable size range (e.g., 20-60 mesh). The particles made by this process are of irregular shape and have reasonable bulk density and good mechanical strength to sustain the pulse testing. After calcination, the particles are washed with a dilute NaOH solution to remove any possible proton sites formed during the calcination step. Before testing, the adsorbents are typically activated at 250° C. under flowing nitrogen for 2 hours. Table 4 depicts various properties of the pre-pressed and pressed ("adsorbent") forms of the rived and unrived zeolites used in this example.

TABLE 4

Properties of Unrived and Rived Zeolites and Adsorbent Therefrom

|  | % Crystal | UCS (Å) | MicroPV (0-20 Å, cc/g) | MesoPV (20-300 Å, cc/g) | BET ($m^2/g$) | ESA ($m^2/g$) | Hg-PV (cc/g) | Total PV (cc/g) | SAR |
|---|---|---|---|---|---|---|---|---|---|
| Unrived NaX Zeolite | 100 | 24.97 | 0.37 | 0.01 | 888 | 26 | N/A | N/A | 2.46 |
| Unrived NaX Adsorbent | 68 | 24.97 | 0.25 | 0.04 | 632 | 31 | 0.31 | 0.60 | 2.95 |
| Rived NaX Zeolite | 70 | 24.96 | 0.27 | 0.12 | 767 | 119 | N/A | N/A | 2.96 |
| Rived NaX Adsorbent | 46 | 24.94 | 0.17 | 0.12 | 499 | 90 | 0.42 | 0.71 | 3.35 |

The separation performance of a particular adsorbent for use in a Simulated Moving Bed ("SMB") adsorptive separation process was tested using a technique known as a "pulse test." The pulse test is a form of liquid chromatography in which a sample of the binary mixture to be separated is injected into a solvent stream flowing through a packed adsorbent column initially saturated with the solvent at a set temperature and pressure. The species emerging from the packed column are monitored by a gas chromatograph as a function of time or volume of solvent passed through the system. The adsorbent to be tested is the column packing and the desorbent to be tested is the flowing solvent. The less weakly adsorbed component of the sample to be separated emerges from the column first, followed by the more strongly adsorbed component of the sample to be separated. For the pulse testing, adsorbent particles of 20-60 mesh (~250-840 microns) were typically used.

The difference in time (or solvent passed) between the emergence of the sample pulses from the adsorbent column, with reference to an unadsorbed tracer component, tells about the selectivity for adsorption of one component over the other. In addition, the width of the peak envelopes at half height ($\Delta w_{1/2}$) of the chromatograph response plotted as a function of time tells information about the rate of exchange between the adsorbent and adsorbate. A narrower peak means a faster adsorption/desorption rate. A faster rate of adsorption/desorption will allow for more efficient utilization of adsorbent inventory, thereby reducing the size and operating costs of an adsorption system.

Figure 4:
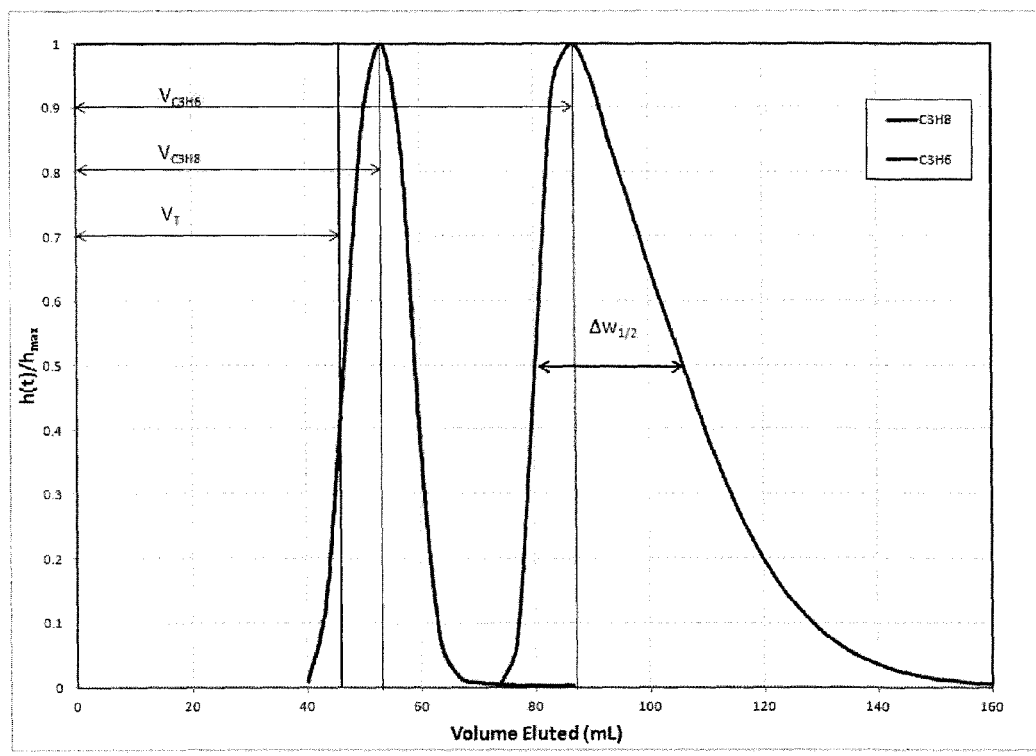
FIG. 4 is an example chromatograph from a pulse test in Example 4.
Figure 5:
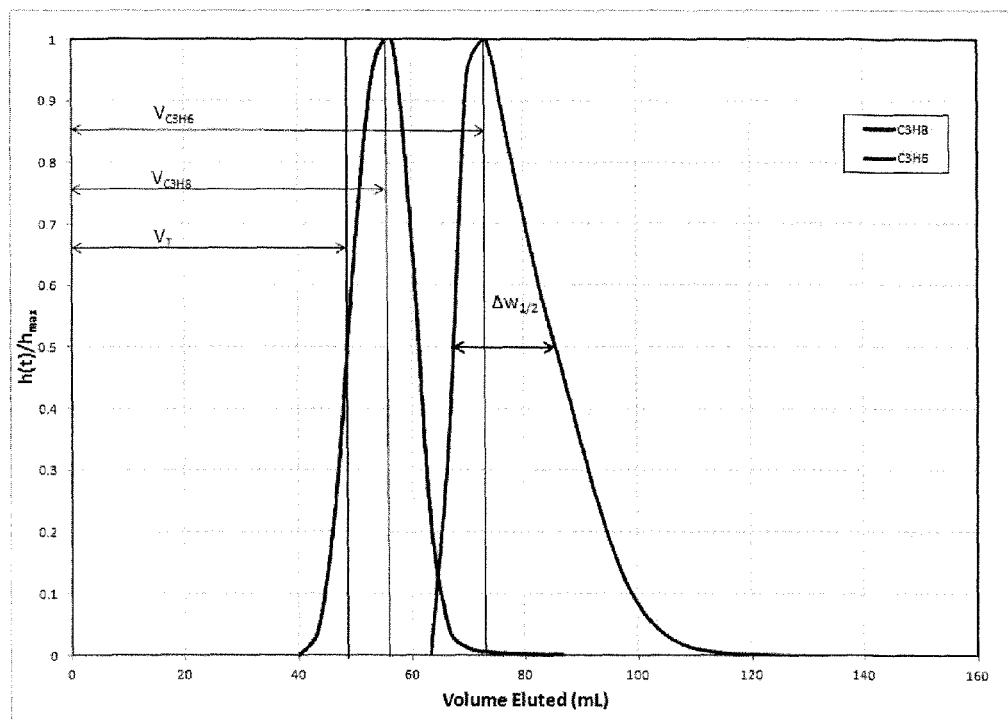
FIG. 5 is another example chromatograph from a pulse test in Example 4.

A pulse test apparatus with an empty volume of 55 cc was used to compare the separation performance of rived and unrived samples of NaX zeolite for the separation of propylene from propane by measuring the adsorption selectivity based upon the retention volumes from the pulse test. The adsorption/desorption rate was also compared for the same adsorbents by observing the width of the peak envelopes at half height of the chromatographic response. The adsorbent chamber was packed with the adsorbent and hexane was used as the desorbent fluid. The pulse test as described above was carried out using a feed mixture of propane and propylene diluted in hexane. The composition of the feed mixture was 7.5% propane, 17.5% propylene, and 75% hexane. Examples of the chromatographs from such tests appear in FIGS. 4 and 5. The test temperature was 50° C. and the pressure was held at 200 psig to ensure propane and propylene to be at liquid state. The propane was less strongly adsorbed and emerged from the adsorbent chamber first, followed by the more strongly adsorbed propylene. The retention volume was calculated at the center of mass of the peak envelope and the selectivity was calculated from the retention volume compared to a tracer run performed with an unadsorbed component determined in a separate pulse experiment. Other experiments were carried out at different temperatures, flow rates, and feed compositions to determine the effect of these parameters on selectivity and adsorption/desorption rates.

Table 5 summarizes the results of the pulse test experiments performed with a temperature of 50° C., pressure of 200 psig, and feed composition of 17.5% propylene, 7.5% propane, and 75% hexane. These experiments were carried out at different flow rates in order to calculate the adsorption/desorption rates. From the diffusivity numbers, it can be observed that the rived NaX materials display much-enhanced transport properties (i.e., adsorption/desorption rate) for both propylene and propane compared to the unrived NaX materials. The selectivity is reduced on the rived NaX material compared to the unrived NaX material. The selectivity of the rived material is closer to values observed in a commercial SMB unit (e.g., generally ~2-5). The aforementioned results on the comparison of selectivity and transport diffusivities between rived and unrived NaX materials were consistent for all conditions tested.

TABLE 5

Pulse Test Results on Unrived NaX Adsorbent and Rived NaX Adsorbent

| Component | Bed T (° C.) | Flow rate (mL/hr) | $\Delta w_{1/2}$ Chromatogram peak width at half-height | Overall Transport Diffusivity D ($cm^2/s$) | Selectivity |
|---|---|---|---|---|---|
| Unrived NaX Adsorbent | | | | | |
| $C_3H_6$ | 50 | 50 | 29.2 | 3.9E–05 | 6.6 |
| | | 70 | 21 | | |
| | | 100 | 15.6 | | |

TABLE 5-continued

Pulse Test Results on Unrived NaX Adsorbent and Rived NaX Adsorbent

| Component | Bed T (° C.) | Flow rate (mL/hr) | $\Delta w_{1/2}$ Chromatogram peak width at half-height | Overall Transport Diffusivity D ($cm^2$/s) | Selectivity |
|---|---|---|---|---|---|
| $C_3H_8$ | 50 | 50 | 15.1 | 1.5E−04 | — |
|  |  | 70 | 7.5 |  |  |
|  |  | 100 | 7.5 |  |  |
| Rived NaX Adsorbent |  |  |  |  |  |
| $C_3H_6$ | 50 | 50 | 20.4 | 1.0E−04 | 4.3 |
|  |  | 70 | 14.3 |  |  |
|  |  | 100 | 10.8 |  |  |
| $C_3H_8$ | 50 | 50 | 14.2 | 1.3E−03 | — |
|  |  | 70 | 10.4 |  |  |
|  |  | 100 | 7.4 |  |  |

The separation of propylene from propane is a large-scale separation that is of great importance for both the chemical and petrochemical industries. It is an energy intensive separation that uses conventional distillation and has a very large plant footprint. The use of SMB technology has been identified as a potential alternative to distillation for the separation of propylene from propane. An SMB adsorption system is characterized by the countercurrent contact of mobile and solid phases. The movements of the solid phase is simulated by periodically shifting the position of the feed, raffinate, desorbent, and extract ports on a set of fixed bed adsorbers. The mixture to be separated is fed into the system continuously. The less strongly held species is transported by the mobile phase in one direction, while the more strongly held component is transported by the solid phase in the opposite direction. This allows both components to be nearly completely recovered from different outlet ports of the SMB system.

An energy savings estimate by using SMB to separate propylene from propane was carried out by assuming local equilibrium and using results of the pulse test experiments to calculate the resulting purities of the extract and raffinate streams from the SMB unit. The hypothetical SMB unit was able to process 6,000 BPSD of a propylene/propane feed (70:30 wt. %) further diluted in hexane. A 100% recovery of propylene in the extract and propane in the raffinate streams was assumed to be achieved. The SMB system was at 50° C., 200 psig, and was fed a feed mixture of 17.5% propylene, 7.5% propane, and 75% hexane. The extract and raffinate streams were subsequently separated using process modeling software to perform a conventional distillation of the two component mixture. A simple heat recovery scheme was used to minimize energy consumption of the process. The calculated energy consumption of the two separations was compared with the energy consumption of a conventional $C_3$ splitter and the results appear in Table 6. In Table 6, the energy savings are compared in terms of utility cost ($/ton $C_3H_6$) and the amount of $CO_2$ emitted (lb/ton $C_3H_6$) due to power inputs needed by the process. Table 6 shows that the utility cost (and therefore energy consumption) by the SMB process can be greatly reduced compared to conventional distillation (~75%).

TABLE 6

Calculated Energy Consumption, Utility Costs, and $CO_2$ Emitted by SMB and Conventional $C_3$ Separation Processes

| Energy Duty | SMB system using rived NaX | Conventional $C_3$ splitter |
|---|---|---|
| Net reboiler heat supply needed (BTU/lb $C_3H_6$) | 483 | 2790 |
| Total Condenser Heat Duty (BTU/lb $C_3H_6$) | 166 | 2774 |
| Total $CO_2$ emissions | 140 | 684 |
| Net utility cost per ton of $C_3H_6$ | $5.74 | $23.41 |

SELECTED DEFINITIONS

It should be understood that the following is not intended to be an exclusive list of defined terms. Other definitions may be provided in the foregoing description accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise" provided above.

As used herein, the terms "having," "has," and "have" have the same open-ended meaning as "comprising," "comprises," and "comprise" provided above.

As used herein, the terms, "including," "include," and "included" have the same open-ended meaning as "comprising," "comprises," and "comprise" provided above.

The term "riving" as used herein refers to the process of incorporating mesoporosity into a zeolitic material.

Unless otherwise indicated, the term "mesoporous" is art-recognized and refers to a porous material comprising pores with an intermediate size, ranging anywhere from about 2 to about 50 nanometers.

The term "mesostructure" is art-recognized and refers to a structure comprising mesopores which control the architecture of the material at the mesoscopic or nanometer scale, including ordered and non-ordered mesostructured materials, as well as nanostructured materials, i.e., materials in which at least one of their dimensions is in the nanometer size range, such as nanotubes, nanorings, nanorods, nanowires, nanoslabs, and the like.

The term "mesostructured zeolites" as used herein includes all crystalline mesoporous materials, such as zeolites, aluminophosphates, gallophosphates, zincophosphates, and titanophosphates. Its mesostructure maybe in the form of ordered mesoporosity (e.g., MCM-41, MCM-48, or SBA-15), non-ordered mesoporosity (e.g., mesocellular foams (MCF)), or mesoscale morphology (e.g., nanorods and nanotubes).

The term "zeolite" is defined as in the International Zeolite Association Constitution (Section 1.3) to include both natural and synthetic zeolites as well as molecular sieves and other microporous and mesoporous materials having related properties and/or structures. The term "zeolite" also refers to a group, or any member of a group, of structured aluminosilicate minerals comprising cations such as sodium and calcium or, less commonly, barium, beryllium, lithium, potassium, magnesium and strontium; characterized by the ratio (Al+Si):O=approximately 1:2, an open tetrahedral framework structure capable of ion exchange, and loosely held water molecules that allow reversible dehydration. The term "zeolite" also includes "zeolite-related materials" or "zeotypes" which are prepared by replacing Si4+ or Al3+ with other elements as in the case of aluminophosphates (e.g., MeAPO, SAPO, ElAPO, MeAPSO, and ElAPSO), gallophosphates, zincophophates, and titanosilicates.

What is claimed is:

1. A method of forming a material comprising a mesoporous zeolite, said method comprising:
   (a) contacting an initial large pore zeolite with a mesopore forming agent to thereby form a first treatment mixture comprising an agent-treated zeolite and said mesopore forming agent;
   (b) contacting said first treatment mixture with an acid to thereby form a second treatment mixture comprising an acid-treated zeolite, said acid, and said mesopore forming agent; and
   (c) contacting said acid-treated zeolite with a base to thereby form a base-treated zeolite having a greater 20 to 135 Å diameter mesopore volume than said initial zeolite,
   wherein said initial large pore zeolite has a framework silicon-to-aluminum ratio ("Si/Al") of less than 2.5.

2. The method of claim 1, wherein said base-treated zeolite has a total 20 to 135 Å diameter mesopore volume of at least 0.05 cc/g.

3. The method of claim 1, wherein said base-treated zeolite has a crystalline content of at least 10 weight percent as measured by X-ray diffraction ("XRD").

4. The method of claim 1, wherein said base-treated zeolite has a total 20 to 135 Å diameter mesopore volume that is at least 0.02 cc/g greater than the 20 to 135 Å diameter mesopore volume of said initial large pore zeolite.

5. The method of claim 1, wherein said initial large pore zeolite is selected from the group consisting of zeolite A and zeolite X.

6. The method of claim 1, wherein said base-treated zeolite is a mesostructured zeolite.

7. The method of claim 1, wherein said acid is present in an initial amount in the range of from about 1 to about 10 milliequivalents per gram of said initial large pore zeolite.

8. The method of claim 1, wherein said acid is present in an initial amount in the range of from about 2 to about 6 milliequivalents per gram of said initial large pore zeolite.

9. The method of claim 1, wherein said mesopore forming agent comprises a surfactant selected from the group consisting of cetyltrimethylammomium bromide, cetyltrimethylammonium chloride, and mixtures thereof.

10. The method of claim 1, wherein said base is present in a ratio with the initial quantity of said initial large pore zeolite in the range of from about 0.1 to 20 mmol per gram of initial zeolite.

11. The method of claim 1, wherein said base is selected from the group consisting of NaOH, $NH_4OH$, KOH, $Na_2CO_3$, TMAOH, and mixtures thereof.

12. The method of claim 1, wherein said acid is selected from the group consisting of hydrochloric acid, sulfuric acid, nitric acid, acetic acid, sulfonic acid, oxalic acid, citric acid, ethylenediaminetetraacetic acid, tartaric acid, malic acid, glutaric acid, succinic acid, and mixtures of two or more thereof.

13. A method of forming a material comprising a mesoporous zeolite, said method comprising:
   (a) contacting an initial large pore zeolite having a framework silicon-to-aluminum ratio in the range of from about 1 to about 2.5 with a mesopore forming agent to thereby produce a first treatment mixture comprising an initially-treated zeolite and said mesopore forming agent;
   (b) introducing an acid into said first treatment mixture to thereby form a second treatment mixture comprising an acid-treated zeolite, said mesopore forming agent, and said acid; and
   (c) contacting said acid-treated zeolite with a base to thereby form a base-treated zeolite having a greater 20 to 135 Å diameter mesopore volume than said initial large pore zeolite, wherein said base-treated zeolite has a total 20 to 135 Å diameter mesopore volume of at least 0.05 cc/g.

14. The method of claim 13, wherein said base-treated zeolite has a total 20 to 135 Å diameter mesopore volume of at least 0.1 cc/g.

15. The method of claim 13, wherein said base-treated zeolite has a crystalline content of at least 10 weight percent as measured by X-ray diffraction ("XRD").

16. The method of claim 13, wherein said base-treated zeolite has a total 20 to 135 Å diameter mesopore volume that is at least 0.02 cc/g greater than the 20 to 135 Å diameter mesopore volume of said initial large pore zeolite.

17. The method of claim 13, wherein said initial large pore zeolite is selected from the group consisting of zeolite A and zeolite X.

18. The method of claim 13, wherein said initial large pore zeolite is a zeolite A.

19. The method of claim 13, wherein said base-treated zeolite is a mesostructured zeolite.

20. The method of claim 13, wherein said acid is present in an initial amount in the range of from about 1 to about 10 milliequivalents per gram of said initial large pore zeolite.

21. The method of claim 13, wherein said acid is present in an initial amount in the range of from about 2 to about 6 milliequivalents per gram of said initial large pore zeolite.

22. The method of claim 13, wherein said acid is selected from the group consisting of hydrochloric acid, sulfuric acid, nitric acid, acetic acid, sulfonic acid, oxalic acid, citric acid, ethylenediaminetetraacetic acid, tartaric acid, malic acid, glutaric acid, succinic acid, and mixtures of two or more thereof.

23. The method of claim 13, wherein said surfactant is selected from the group consisting of cetyltrimethylammomium bromide, cetyltrimethylammonium chloride, and mixtures thereof.

24. The method of claim 13, wherein said base is selected from the group consisting of NaOH, $NH_4OH$, KOH, $Na_2CO_3$, TMAOH, and mixtures thereof.

* * * * *

UNITED STATES PATENT AND TRADEMARK OFFICE
CERTIFICATE OF CORRECTION

PATENT NO. : 9,580,329 B2
APPLICATION NO. : 13/740839
DATED : February 28, 2017
INVENTOR(S) : Kunhao Li, Javier Garcia-Martinez and Michael G. Beaver It is certified that error appears in the above-identified patent and that said Letters Patent is hereby corrected as shown below:

In the Specification

Column 1 after Line 12 insert:
--This Invention was made with government support under Contract No. DE-EE0003470 awarded by the Department of Energy. The Government has certain rights in this invention.--

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*